(12) United States Patent
Palm et al.

(10) Patent No.: US 12,070,732 B2
(45) Date of Patent: Aug. 27, 2024

(54) HIGHLY EFFECTIVE FUNCTIONAL ADDITIVE PRODUCTS

(71) Applicant: EP MINERALS, LLC, Reno, NV (US)

(72) Inventors: Scott Kevin Palm, Reno, NV (US); Fangfu Zhang, Reno, NV (US)

(73) Assignee: U.S. Silica Company, Katy, TX (US)

( * ) Notice: Subject to any disclaimer, the term of this patent is extended or adjusted under 35 U.S.C. 154(b) by 692 days.

(21) Appl. No.: 17/309,776

(22) PCT Filed: Dec. 20, 2018

(86) PCT No.: PCT/US2018/066872
§ 371 (c)(1),
(2) Date: Jun. 17, 2021

(87) PCT Pub. No.: WO2020/131075
PCT Pub. Date: Jun. 25, 2020

(65) Prior Publication Data
US 2022/0048009 A1    Feb. 17, 2022

(51) Int. Cl.
*B01J 20/14*   (2006.01)
*B01J 20/30*   (2006.01)

(52) U.S. Cl.
CPC .......... *B01J 20/14* (2013.01); *B01J 20/3021* (2013.01); *B01J 20/3078* (2013.01)

(58) Field of Classification Search
None
See application file for complete search history.

(56) References Cited

U.S. PATENT DOCUMENTS

| | | | | |
|---|---|---|---|---|
| 3,499,778 A | * | 3/1970 | Brody | ........................ C09C 1/30 106/253 |
| 5,167,707 A | * | 12/1992 | Freeman | ................. C01B 33/26 428/452 |
| 9,834,684 B2 | | 12/2017 | Greene et al. | |
| 2003/0127022 A1 | | 7/2003 | Palm et al. | |
| 2009/0029171 A1 | | 1/2009 | Danvers et al. | |
| 2010/0031379 A1 | | 12/2010 | Guynn et al. | |
| 2010/0313795 A1 | | 12/2010 | Guynn et al. | |

(Continued)

FOREIGN PATENT DOCUMENTS

| | | |
|---|---|---|
| CN | 104704065 A | 6/2015 |
| WO | 2010042614 A1 | 4/2010 |
| WO | 2010104831 A1 | 9/2010 |

(Continued)

OTHER PUBLICATIONS

EP Minerals, LLC Information Sheet entitled, "Formulating High-Quality Coating with Celatom Functional Additives", pages Aug. 3, 2019, pp. 1-21.

*Primary Examiner* — Stefanie J Cohen
(74) *Attorney, Agent, or Firm* — The Webb Law Firm

(57) ABSTRACT

This invention concerns highly effective functional additive products that comprise diatomite. More particularly, it concerns such functional additive products possessing particle size distributions which make them more effective as functional additives in filled systems. Higher effectiveness is demonstrated through lower Standard Sheen and/or reduced unit consumption relative to diatomite functional additives already in the public domain. Such products may also possess high brightness, low tint and/or an absence of detectable crystalline silica.

19 Claims, 4 Drawing Sheets

(56) References Cited

U.S. PATENT DOCUMENTS

| | | |
|---|---|---|
| 2016/0005520 A1 | 3/2016 | Cheng |
| 2016/0059208 A1 | 3/2016 | Wanene et al. |

FOREIGN PATENT DOCUMENTS

| | | |
|---|---|---|
| WO | 2014092868 A1 | 6/2014 |
| WO | 2014193487 A1 | 12/2014 |
| WO | 2017069809 A1 | 4/2017 |
| WO | 2017069810 A1 | 4/2017 |
| WO | 2019009930 A1 | 1/2019 |

\* cited by examiner

HIGHLY EFFECTIVE FUNCTIONAL ADDITIVE PRODUCTS

CROSS-REFERENCE TO RELATED APPLICATION

This application is a U.S. National Stage Application of International Application No. PCT/US2018/066872 filed on Dec. 20, 2018. The entire disclosure of the above application is incorporated herein by reference.

TECHNICAL FIELD

This present disclosure concerns highly effective functional additive products that comprise diatomite. More particularly, it concerns such functional additive products possessing particle size distributions which make them more effective as functional additives in filled systems and as anti-block agents. Higher effectiveness is demonstrated through reduced sheen and/or reduced unit consumption relative to diatomite functional additives already in the public domain.

BACKGROUND

Diatomite, also sometimes referred to diatomaceous earth (DE) or kieselguhr, is an industrial mineral comprising the skeletal remains (called frustules) of single-celled plants called diatoms. Diatoms, which generally inhabit stationary bodies of water, such as lakes or oceans, are a type of algae that forms an intricate opaline silica structure as part of their cell walls. As diatoms die, their remains sink to the bottom of lakes or oceans and, over a period of time, the remains accumulate. Over time, the organic portion of the remains disappears but the intricate silica frustules remain and form deposits of diatomaceous earth. Diatomaceous earth refers to a type of sedimentary rock that comprises diatom frustules and, generally, other minerals.

Depending on the composition and properties of the diatomaceous earth, it can be processed to produce powdered or granular products, which may be generally referred to as diatomite or kieselguhr products. The term diatomite and the term diatomaceous earth (DE) are used interchangeably herein. Powdered products often contain particles ranging in size from a few microns up to about 300 microns, whereas granular products comprising diatomite are characterized in screen mesh size, rather than micron size. This disclosure concerns products comprising powdered diatomite (kieselguhr).

The frustule structure of diatomite provides a number of valuable properties to products comprising diatomite. Frustules contain submicron pore openings and a significant pore volume. As a result, powdered diatomite products possess a much lighter packed density than most inorganic substances. This provides for buoyancy in liquid systems, fine particle holding capacity, light scattering, opacity and mold release properties.

Diatomite has been mined and used commercially in a large number of applications throughout most of the industrial age. In an early industrial use, diatomite was used as an ingredient, together with nitroglycerine, in dynamite Since the early 1900's, the largest application for powdered diatomite has been in liquid processing applications, where it is used as a filter media and is often called a filter aid, and where diatomite's buoyancy and fine particle holding capacity are advantageous.

Since about the 1950's, the second-largest applications for powdered diatomite has been as a functional additive, particularly in paint and coatings applications and in plastic film and elastomer applications. In these applications, the buoyancy, light scattering and mold release properties of diatomite have contributed to the adoption of diatomite.

In coatings, diatomite has found widespread application as a flatting (or often called matting) additive in flat paints (or coatings). When used in flat paints, the main function of diatomite is to reduce the amount of light reflected from the surface of the paint. Two measures of reflection are commonly-used to measure the flatting or matting effectiveness of diatomite in a coating, gloss and sheen. Gloss is a measure of the amount of light reflected at a 60° angle from the surface of the paint, and sheen is a measure of the amount of light reflected at an 85° angle from the surface of the paint.

The inventors have found that gloss measurements in coatings created by functional additives are more robust than sheen additives. In other words, modifications of functional additives are more likely to be measurable in changes in the sheen of coatings than in changes in the gloss of coatings.

As the effective density and porosity of the diatomite provides for buoyancy in liquid systems, this allows for the use of larger diatomite particles in paint and coatings systems than is possible for most other inorganic particulate materials, which are denser and are more prone to settling. The larger size of the DE particles and their irregular surface structure are thought to contribute to the effectiveness of diatomite products as flatting and matting agents in paint and coatings.

Diatomite functional additives are presently used, or have been used in the past, in cosmetics, toothpaste, in facial masks and in other personal care products. The functionality of diatomite in these applications has some overlap with its functionality in coatings, in that the product can provide light scattering and sheen and gloss reduction. However, diatomite functional additives also provide for absorption and abrasion and surface scrubbing in certain personal care applications.

Adhesives, sealants and caulks are similar filled systems that can sometimes comprise diatomite products.

Diatomite has also found widespread use as an anti-block agent in plastic films, most notably in low density and linear low-density polyethylene films. Diatomite functional additives are generally incorporated in the plastic films to prevent the blocking, or frictional adhesion of films. When used as an anti-blocking agent, a relatively small amount of diatomite may be added to the polymer prior to the formation of the plastic film and the anti-blocking effect generally occurs when the diatomite particle protrudes just above the surface of the film. A similar type of phenomenon occurs when diatomite is added to elastomers to provide for mold release, in that particles that protrude above the surface of the elastomer product contact the mold surface and prevent adhesion and thereby facilitate release. US Patent Publication 2009/0029171 (Danvers et al.) teaches functional additives for use as anti-block filler products for plastic films and the like. Danvers et al. sought to minimize the top particle size (D90 in Danvers et al.) as "classic theory suggests that a top size of below 10 microns gives the best impact [reinforcement] strength [in polymers] as particles larger than this provide crack nucleation points within the polymer matrix." The micronized diatomite filler products of Danvers et al. have a D90 of less than 20 microns and a D50 of less than 10 microns, D90 of less than 18 microns and a D50 of less than 8 microns, D90 of less than 16 microns and a D50 of less than 6 microns, D90 of less than 13 microns and a D50 of less than 4 microns, and a D90 of less than 10 microns and a D50 of less than 3 microns.

Diatomite functional additives may be produced and used in powdered form through a series of processes which include crushing, milling, drying, thermal sintering and dispersion and air classification. Two types of thermal sintering processes are employed in the diatomite industry, straight calcining, in which the powdered diatomite is heated to its softening point in the absence of a flux additive, so that the particles agglomerate to form a coarser powder than natural diatomite, and flux calcining, in which the particles are heated to their softening point in the presence of a flux, generally a sodium flux such as soda ash, and the particles are typically agglomerated to form a coarser powder than straight calcined diatomite. During these processes, the functional additive products have traditionally been produced as co-products of diatomite filtration media, but they can also be produced as primary products with little or no co-product.

Straight calcining generally turns diatomite particles pink, rendering them undesirable for most functional additive applications. Flux calcining generally turns diatomite particles white. As a result, flux calcined products have been preferred for use in functional additive applications for many years. One unintended consequence of traditional calcining and flux calcining processes for diatomite is that they can convert a portion of the opaline structure of the diatom frustules to cristobalite, a form of crystalline silica. The cristobalite produced during thermal processing, along with any silica naturally-occurring within the diatomite ore and not removed during processing, become components of the final functional additive products.

Breese, O. Y. and Bodycomb, Frederick M. provide an overview of the diatomite industry, production processes, deposits and products in Industrial Minerals and Rocks, 7th Edition on pages 433-450.

In 1987, The International Agency for Research on Cancer (IARC), a part of the United Nations, determined that crystalline silica, when inhaled over a prolonged period, is a probable human carcinogen. IARC later changed the classification from probable to known human carcinogen. These warnings raised concerns with users of calcined and flux calcined diatomite products, including users of flux calcined diatomite functional additives, in the 1990's, and a significant substitution of natural diatomite functional additives for flux calcined functional additives occurred within the paint and coatings industry at that time.

Natural diatomite products are thermally processed to remove the free moisture of the diatomite, but, unlike calcined and flux calcined diatomite products, they are not heated to the softening point of the diatomite and no agglomeration of particles occurs. As a result, natural diatomite products do not contain cristobalite, one of the two main forms of crystalline silica found in diatomite products. Through careful ore selection, it is possible to produce natural diatomite functional additives that do not require cancer hazard warning labels or warning for the risk of cancer.

As a result, natural diatomite products have enjoyed an advantage over flux calcined diatomite products relative to health warnings and perceived health risks. However, natural diatomite products possess some significant performance disadvantages relative to flux calcined products, specifically with regard to higher tint, lower brightness and are less effective in sheen reduction.

WO 2019/009930 published on Jan. 10, 2019 ("Lenz et al.") taught that flux calcined diatomite products free of detectable crystalline silica, yet possessing tint, brightness and sheen characteristics superior to those of natural diatomite products, can be produced. This application makes use of the teachings of Lenz et al.

Whether the diatomite functional additive is calcined, flux calcined or natural, the current products all have limitations in terms of their effectiveness. There is a need for higher performance, lower unit consumption functional additives that comprise diatomite, especially products that possess attractive tint and brightness and do not contain detectable levels of crystalline silica.

Functional additive products that comprise diatomite can be characterized in various ways, including through the particle size distribution, the Hegman fineness value, the density (such as centrifuged wet density), the oil absorption (Gardner Coleman Oil Absorption), tint or brightness. Another useful way of characterizing diatomite functional additives is through measurement of the properties of standard coatings formulations which contain the diatomite products.

Various measures of the particle size distribution can be used to describe the particle size distribution. Depending on the application, measurements of the percentage of a particular product that is finer than a particular size can be useful. D10, D50, D90 and D95, which are included in this application for many samples of diatomite functional fillers of the prior art and for the products of the present disclosure, indicate the particle size, in microns, for a particular product, for which 10%, 50%, 90% or 95% of the product, by weight, respectively, is finer than.

The standard deviation (SD) of the particle size distribution of a product is a statistical representation of the variability in the particle size from the median particle size D50. The Ratio (R) of the standard deviation SD of the particles size to the D50 provides a standardized indication of the width of the particle size distribution. The Ratio (R) may be calculated as:

$$R=(SD)/(D50)$$

where SD is the standard deviation of the particle size distribution of the product, and D50 is the particle size (value) at which 50% of the sample particles have a diameter equal to or less than that value.

A low R (ratio of standard deviation SD to D50) indicates that the particle size range of a particular product varies less from its D50 value than a high R (ratio of standard deviation SD of the particle size to D50).

The Hegman fineness is a measure of the surface smoothness of both a functional additive product and a coating product and is widely used in the coatings industry to identify functional additive products suitable for target coating properties. Generally, two functional additive products for coatings should have similar Hegman values in order to be considered possibly interchangeable. If the Hegman values are similar, then other properties of the products, such as brightness, tint, abrasion or scrub resistance, and various other properties may be further considered to determine interchangeability.

The centrifuged wet density is a measure of bulk density commonly used in the diatomite industry to measure the effective density of diatomite in a liquid system. Although developed originally for use in filtration applications for diatomite, where it is a good indicator of the unit consumption of diatomite, it has also been used to characterize diatomite filtration media.

The Gardner Coleman Oil Absorption (GCOA) is a measure of the absorption of oil by a product comprising diatomite, or for other products used in coatings. This measures, to some extent, the impact of the additive on resin or binder demand in a coating product.

Optical properties include various tint and brightness measures, as well as gloss and sheen. The tint and brightness can be measured both for the functional additive and for the formulated product, such as paint. The gloss and sheen and sometimes reflections at other angles, such as 20°, are measured directly for coatings, not for the functional additive. However, by including different functional additives in the same standard coating formulation, it is possible to obtain measures of the gloss and sheen attributable to the functional additives when incorporated in standard formulations.

The inventors have found that sheen, in particular, which is an important property for most coatings, is very sensitive to the characteristics of the diatomite functional additive and that by measuring the sheen of coatings containing different functional additives, each comprising diatomite, in a standard formulation, it is possible to differentiate between the different additives. For the purposes of this disclosure, we refer to the sheen of a coating containing a standard amount of a functional additive (such functional additive comprising diatomite) in a standard formulation as the "Standard Sheen" of the functional additive (that comprises diatomite).

Tables 1~4 include the characteristics of the diatomite functional additives of the prior art. The tables include data developed by EP Minerals' research and development laboratory from samples of EP Minerals' products, as well as samples from other leading diatomite functional additive producers, including Imerys, and Ceca. These samples were tested using standard test methods, and the data derived from these tests is consistent, in terms of its development.

Table 5 shows some typical technical characteristics of products in the public domain as provided by manufactures. These properties may have been measured using similar methods as those used in Tables 1-4, but the precise methods are not disclosed in detail in the company literature.

Products generally in the Hegman range of about 0.5 to about 3.5 are the products used in the highest volumes in industry. Flux calcined products in this Hegman range include Celite 281, Celite 499, Clarcel DIF D, and MW 27. Natural diatomite products in this Hegman range include Diafil 525, Diafil 540, Celtix, CelaWhite and LCS-3.

As Tables 1-4 show, the Standard Sheen (see values for 85° for "Paint Properties in Standard Formulation") for the natural and flux calcined products of the prior art in the Hegman range of 1.0 to 2.0, ranges from 0.6 to 1.4, and the Standard Sheen for natural and flux calcined products of the prior art in the Hegman range of 2.5 to 3.5, ranges from 0.9 to 2.3. Over these Hegman ranges, the products in the public domain have Ratio (R) values of 0.49 to 0.84 and 0.44 to 0.74, respectively.

At equivalent Hegman values, the flux calcined products of the prior art have lower sheen values than the natural products, and the flux calcined products have higher brightness and lower tint than the natural products of the prior art.

TABLE 1

Typical properties of selected flux calcined diatomite functional additives of IMERYS[1]

| Sample ID | | 20022 | 38816 | 9103 | 37072 | 39569 |
|---|---|---|---|---|---|---|
| Product Information | | Celite 281 Lompoc, CA | Celite 281 Lompoc, CA | Celite 281 Lompoc, CA | Celite 281 Lompoc, CA | Celite 281 Lompoc, CA |
| Particle Size | D10 (μm) | 7.10 | 7.41 | 7.48 | 7.72 | 6.45 |
| Distribution | D50 (μm) | 20.20 | 20.95 | 20.47 | 19.77 | 18.91 |
| | D90 (μm) | 50.61 | 51.79 | 47.14 | 45.66 | 49.45 |
| | D95 (μm) | 66.36 | 68.38 | 60.83 | 59.02 | 65.77 |
| | SD (μm) | 15.85 | 16.31 | 14.72 | 14.22 | 15.80 |
| | Ratio (R) = SD/D50 | 0.78 | 0.78 | 0.72 | 0.72 | 0.84 |
| | Wet Sieve + 44 μm (%) | 0.9 | 2.9 | 1.5 | 1.2 | 2.0 |
| Hegman (WM) | | 1.0 | 1.0 | 1.0 | 1.0 | 1.0 |
| CWD (g/ml) | | 0.30 | 0.29 | 0.30 | 0.32 | 0.32 |
| GCOA (%) | | 149 | 163 | 154 | 151 | 149 |
| Optical | Y | 88.65 | 84.12 | 86.87 | 87.51 | 85.78 |
| Properties | L* | 95.43 | 93.50 | 94.68 | 94.95 | 94.22 |
| | a* | −0.2 | 0.11 | 0.12 | −0.03 | 0.2 |
| | b* | 1.64 | 1.9 | 1.85 | 2.04 | 2.94 |
| Paint Properties | Standard Y | 87.72 | 87.15 | 87.43 | 87.81 | 88.15 |
| in Standard | Std. Contrast Ratio (Y) | 0.93 | 0.91 | 0.91 | 0.92 | 0.91 |
| Formulation | L* | 95.04 | 94.8 | 94.92 | 95.08 | 95.22 |
| | a* | −0.48 | −0.04 | −0.08 | −0.09 | −0.02 |
| | b* | 1.17 | 1.03 | 1.07 | 1.02 | 0.99 |
| | 20° | 1.4 | 1.3 | 1.3 | 1.3 | 1.3 |
| | 60° | 2.0 | 1.9 | 1.9 | 1.9 | 1.9 |
| | 85° Std. Sheen | 0.6 | 0.6 | 0.6 | 0.7 | 0.8 |
| | Flatting Efficiency (%)[2] | 95% | 95% | 95% | 94% | 93% |

TABLE 1-continued

Typical properties of selected flux calcined diatomite functional additives of IMERYS[1]

| Sample ID | | 40729 Celite 281 | 32083 Celite 281 | 27626 Celite 281 | 20023 Celite 499 |
|---|---|---|---|---|---|
| Product Information | | Quincy, WA | Spain | Mexico | Lompoc, CA |
| Particle Size Distribution | D10 (µm) | 9.42 | 8.20 | 6.72 | 4.59 |
| | D50 (µm) | 19.91 | 15.90 | 12.35 | 12.20 |
| | D90 (µm) | 43.07 | 28.60 | 21.76 | 30.66 |
| | D95 (µm) | 55.45 | 35.10 | 26.93 | 42.87 |
| | SD (µm) | 12.34 | 7.47 | 5.48 | 9.04 |
| | Ratio (R) = SD/D50 | 0.62 | 0.47 | 0.44 | 0.74 |
| | Wet Sieve + 44 µm (%) | 2.1 | trace | trace | 0.8 |
| Hegman (WM) | | 1.0 | 2.5 | 3.0 | 3.0 |
| CWD (g/ml) | | 0.34 | 0.38 | 0.42 | 0.29 |
| GCOA (%) | | 149 | 127 | 154 | 177 |
| Optical Properties | Y | 92.72 | 94.20 | 94.30 | 89.51 |
| | L* | 97.11 | 97.70 | 97.80 | 95.79 |
| | a* | −0.67 | −0.1 | −0.2 | 0.03 |
| | b* | 4.00 | 1.30 | 1.30 | 2.29 |
| Paint Properties in Standard Formulation | Standard Y | 87.99 | 88.39 | 88.7 | 88.65 |
| | Standard Contrast Ratio (Y) | 0.90 | 0.91 | 0.92 | 0.93 |
| | L* | 95.16 | 95.33 | 95.45 | 95.43 |
| | a* | −0.11 | −0.40 | −0.09 | −0.33 |
| | b* | 1.12 | 1.28 | 0.91 | 1.38 |
| | 20° | 1.3 | 1.4 | 1.3 | 1.4 |
| | 60° | 1.9 | 2.1 | 2.0 | 2.1 |
| | 85° Standard Sheen | 0.7 | 0.9 | 1.2 | 1.2 |
| | Flatting Efficiency (%)[2] | 94% | 92% | 90% | 90% |

| Sample ID | | 39570 Celite 499 | 22222 Celite 499 | 18904 White Mist | 20012 White Mist |
|---|---|---|---|---|---|
| Product Information | | Quincy, WA | Spain | | |
| Particle Size Distribution | D10 (µm) | 6.93 | 7.51 | 2.09 | 3.50 |
| | D50 (µm) | 14.32 | 14.47 | 6.79 | 8.55 |
| | D90 (µm) | 27.86 | 24.72 | 19.02 | 19.40 |
| | D95 (µm) | 35.29 | 29.99 | 26.94 | 25.82 |
| | SD (µm) | 7.61 | 6.81 | 6.04 | 5.81 |
| | Ratio (R) = SD/D50 | 0.53 | 0.47 | 0.89 | 0.68 |
| | Wet Sieve + 44 µm (%) | Trace | 0.2 | 0.3 | 0.3 |
| Hegman (WM) | | 3.0 | 3.5 | 5.0 | 5.5 |
| CWD (g/ml) | | 0.32 | 0.38 | 0.37 | 0.38 |
| GCOA (%) | | 134 | 140 | 138 | 135 |
| Optical Properties | Y | 92.49 | 91.20 | 89.31 | 90.82 |
| | L* | 97.02 | 96.50 | 95.71 | 95.30 |
| | a* | −0.5 | −0.1 | 0.01 | −0.17 |
| | b* | 3.56 | 1.60 | 1.34 | 1.09 |
| Paint Properties in Standard Formulation | Standard Y | 88.7 | 88.67 | 88.45 | 87.83 |
| | Standard Contrast Ratio (Y) | 0.91 | 0.91 | 0.92 | 0.92 |
| | L* | 95.45 | 95.44 | 95.35 | 95.09 |
| | a* | −0.09 | −0.41 | −0.04 | −0.41 |
| | b* | 0.97 | 1.04 | 0.89 | 0.98 |
| | 20° | 1.3 | 1.4 | 1.3 | 1.4 |
| | 60° | 2.0 | 2.1 | 2.1 | 2.3 |
| | 85° Standard Sheen | 1.0 | 1.0 | 2.1 | 2.1 |
| | Flatting Efficiency (%)[2] | 92% | 92% | 82% | 82% |

[1] Data generated by the Research and Development laboratory of EP Minerals, LLC, a U.S. Silica Company.

[2] For a given sample, Flatting Efficiency was calculated as the percent reduction in 85° sheen for the standard formulation (49 PVC) compared to a paint of the same formulation but without diatomite.

TABLE 2

Typical properties of selected flux calcined diatomite functional additives from Ceca[1]

| Sample ID<br>Product Information | | 17955<br>Clarcel DIF D | 22167<br>Clarcel DIF D | 17956<br>Clarcel DIF N |
|---|---|---|---|---|
| Particle Size<br>Distribution | D10 (μm) | 6.00 | 5.96 | 2.16 |
| | D50 (μm) | 15.82 | 16.62 | 7.38 |
| | D90 (μm) | 36.38 | 38.29 | 19.92 |
| | D95 (μm) | 47.37 | 49.43 | 26.74 |
| | SD (μm) | 11.12 | 12.01 | 6.57 |
| | Ratio (R) = SD/D50 | 0.70 | 0.72 | 0.89 |
| | Wet Sieve + 44 μm (%) | 0.6 | 1.0 | 0.3 |
| Hegman (WM) | | 2.0 | 2.0 | 4.0 |
| CWD (g/ml) | | 0.43 | 0.38 | 0.59 |
| GCOA (%) | | 140 | 142 | 97 |
| Optical<br>Properties | Y | 86.9 | 89.14 | 86.80 |
| | L* | 94.7 | 95.64 | 94.70 |
| | a* | −0.04 | −0.62 | −0.07 |
| | b* | 2.16 | 2.39 | 1.55 |
| Paint Properties in<br>Standard Formulation | Standard Y | 87.9 | 88.25 | 88.07 |
| | Standard Contrast Ratio (Y) | 0.92 | 0.93 | 0.91 |
| | L* | 95.12 | 95.27 | 95.19 |
| | a* | −0.05 | −0.07 | −0.05 |
| | b* | 1.00 | 0.97 | 0.88 |
| | 20° | 1.3 | 1.3 | 1.3 |
| | 60° | 2.0 | 2.0 | 2.1 |
| | 85° Standard Sheen | 0.7 | 0.7 | 1.8 |
| | Flatting Efficiency (%)[2] | 94% | 94% | 85% |

[1]Data generated by the Research and Development laboratory of EP Minerals, LLC, a U.S. Silica Company.
[2]For a given sample, Flatting Efficiency was calculated as the percent reduction in 85° sheen for the standard formulation (49 PVC) compared to a paint of the same formulation but without diatomite.

TABLE 3

Typical properties of selected flux calcined diatomite functional additives from EP Minerals[1]

| Sample ID<br>Product Information | | 2B19A16F<br>MW25 | 37850<br>MW25 | 3A20A17F<br>MW27 | 3C16A17F<br>MW27 | 2A09A17F<br>MW27 |
|---|---|---|---|---|---|---|
| Particle Size<br>Distribution | D10 (μm) | 6.72 | 6.68 | 8.76 | 8.34 | 7.44 |
| | D50 (μm) | 11.09 | 11.51 | 18.93 | 17.43 | 14.28 |
| | D90 (μm) | 18.40 | 19.52 | 40.39 | 36.20 | 28.62 |
| | D95 (μm) | 22.23 | 23.63 | 51.39 | 45.78 | 37.17 |
| | SD (μm) | 4.39 | 5.09 | 11.74 | 10.28 | 7.58 |
| | Ratio (R) = SD/D50 | 0.40 | 0.44 | 0.62 | 0.59 | 0.53 |
| | Wet Sieve + 44 μm (%) | trace | trace | 1.9 | 0.8 | 0.8 |
| Hegman (WM) | | 4.0 | 4.5 | 1.5 | 2.0 | 2.0 |
| CWD (g/ml) | | 0.37 | 0.38 | 0.38 | 0.37 | 0.38 |
| GCOA (%) | | 125 | 121 | 134 | 141 | 143 |
| Optical<br>Properties | Y | 91.19 | 92.68 | 91.60 | 92.70 | 93.18 |
| | L* | 96.49 | 97.1 | 96.66 | 97.11 | 97.30 |
| | a* | 0.02 | 0.21 | −0.19 | −0.14 | −0.07 |
| | b* | 1.0 | 1.84 | 2.10 | 1.96 | 1.45 |
| Paint Properties<br>in standard<br>Formulation | Standard Y | 89.36 | 89.39 | 87.82 | 87.78 | 87.6 |
| | Standard<br>Contrast Ratio | 0.91 | 0.92 | 0.90 | 0.91 | 0.89 |
| | L* | 95.73 | 95.74 | 95.09 | 95.07 | 94.99 |
| | a* | −0.02 | −0.02 | −0.44 | −0.46 | −0.45 |
| | b* | 1.34 | 1.47 | 1.19 | 1.17 | 1.22 |
| | 20° | 1.3 | 1.3 | 1.4 | 1.4 | 1.4 |
| | 60° | 2.0 | 2.0 | 2.0 | 2.0 | 2.0 |
| | 85° Std. Sheen | 1.3 | 1.2 | 0.6 | 0.7 | 0.8 |
| | Flatting<br>Efficiency (%)[2] | 89% | 90% | 95% | 94% | 93% |
| Sample ID<br>Product Information | | AA1AA17F<br>MW27 | 2D24A15F<br>CelaBrite | 20222<br>CelaBloc | 2C25F13<br>CelaBloc | |
| Particle Size<br>Distribution | D10 (μm) | 6.36 | 6.31 | 1.96 | 1.98 | |
| | D50 (μm) | 14.39 | 11.04 | 5.98 | 6.14 | |
| | D90 (μm) | 31.20 | 19.35 | 12.46 | 12.00 | |
| | D95 (μm) | 40.29 | 23.77 | 15.97 | 14.65 | |
| | SD (μm) | 9.11 | 4.79 | 3.92 | 3.86 | |

TABLE 3-continued

Typical properties of selected flux calcined diatomite functional additives from EP Minerals[1]

|  |  |  |  |  |  |
|---|---|---|---|---|---|
|  | Ratio (R) = SD/D50 | 0.63 | 0.43 | 0.66 | 0.63 |
|  | Wet Sieve + 44 μm (%) | 0.3 | trace | trace | trace |
| Hegman (WM) |  | 3.0 | 5.0 | 6.0 | 6.5 |
| CWD (g/ml) |  | 0.36 | 0.41 | 0.72 | 0.73 |
| GCOA (%) |  | 126 | 134 | 65 | 65 |
| Optical Properties | Y | 89.68 | 92.87 | 89.50 | 90.02 |
|  | L* | 95.87 | 97.18 | 95.19 | 96.00 |
|  | a* | −0.18 | −0.04 | −0.56 | −0.35 |
|  | b* | 1.13 | 1.74 | 2.09 | 2.61 |
| Paint Properties in Standard Formulation | Standard Y | 87.81 | 88.08 | 88.27 | 88.69 |
|  | Standard Contrast Ratio (Y) | 0.93 | 0.92 | 0.90 | 0.91 |
|  | L* | 95.08 | 95.2 | 95.27 | 95.45 |
|  | a* | −0.46 | −0.44 | −0.42 | −0.07 |
|  | b* | 0.76 | 1.13 | 1.34 | 1.11 |
|  | 20° | 1.4 | 1.4 | 1.4 | 1.3 |
|  | 60° | 2.1 | 2.1 | 2.5 | 2.4 |
|  | 85° Standard Sheen | 0.9 | 1.2 | 4.3 | 4.0 |
|  | Flatting Efficiency (%)[2] | 92% | 90% | 64% | 66% |

[1]Data generated by the Research and Development laboratory of EP Minerals, LLC, a U.S. Silica Company.
[2]For a given sample, Flatting Efficiency was calculated as the percent reduction in 85° sheen for the standard formulation (49 PVC) compared to a paint of the same formulation but without diatomite.

TABLE 4

Typical properties of selected natural diatomite functional additives[1]

| Product Manufacturer |  | IMERYS |  |  |  | EP Minerals |  |
|---|---|---|---|---|---|---|---|
| Sample ID Product Information |  | 26483 DiaFil 525 | 27627 CelTix | 37864 DiaFil 540 | 27683 DiaFil 570 | L18A161 CelaWhite | A21B14 LCS-3 |
| Particle Size Distribution | D10 (μm) | 6.28 | 5.05 | 6.06 | 6.16 | 7.04 | 7.88 |
|  | D50 (μm) | 13.51 | 12.89 | 11.60 | 12.38 | 13.99 | 15.35 |
|  | D90 (μm) | 31.46 | 27.85 | 20.10 | 23.69 | 26.75 | 29.5 |
|  | D95 (μm) | 42.71 | 37.93 | 23.65 | 30.42 | 34.69 | 39.01 |
|  | SD (μm) | 8.62 | 7.50 | 5.31 | 6.4 | 6.90 | 7.72 |
|  | Ratio (R) = SD/D50 | 0.64 | 0.58 | 0.46 | 0.52 | 0.49 | 0.50 |
|  | Wet Sieve + 44 μm (%) | 1.4 | 1.0 | trace | 0.2 | 0.6 | 1.2 |
| Hegman (WM) |  | 2.0 | 2.5 | 3.5 | 4.0 | 2.0 | 2.5 |
| CWD (g/ml) |  | 0.45 | 0.35 | 0.45 | 0.43 | 0.32 | 0.33 |
| GCOA (%) |  | 121 | 259 | 132 | 123 | 182 | 179 |
| Optical Properties | Y | 80.46 | 83.40 | 80.16 | 81.57 | 85.12 | 81.50 |
|  | L* | 91.89 | 93.20 | 91.76 | 92.38 | 93.94 | 92.40 |
|  | a* | 0.34 | 0.20 | 0.21 | 0.14 | 0.12 | 0.00 |
|  | b* | 7.13 | 5.40 | 6.61 | 7.19 | 6.01 | 7.00 |
| Paint Properties in Standard Formulation | Standard Y | 86.34 | 88.14 | 86.88 | 87.88 | 87.84 | 87.73 |
|  | Standard Contrast Ratio (Y) | 0.93 | 0.96 | 0.91 | 0.93 | 0.94 | 0.94 |
|  | L* | 94.46 | 95.22 | 94.69 | 95.11 | 95.09 | 95.05 |
|  | a* | −0.44 | −0.38 | −0.08 | −0.35 | −0.49 | −0.50 |
|  | b* | 2.2 | 2.07 | 2.28 | 2.49 | 2.14 | 2.18 |
|  | 20° | 1.4 | 1.4 | 1.3 | 1.4 | 1.4 | 1.4 |
|  | 60° | 2.2 | 2.2 | 2.1 | 2.1 | 2.2 | 2.2 |
|  | 85° (Std. Sheen) | 1.4 | 2.3 | 2.1 | 1.8 | 1.3 | 1.2 |
|  | Flatting Efficiency (%) | 88% | 81% | 82% | 85% | 89% | 90% |

[1]Data generated by the Research and Development laboratory of EP Minerals, LLC, a U.S. Silica Company.
[2]For a given sample, Flatting Efficiency was calculated as the percent reduction in 85° sheen for the standard formulation (49 PVC) compared to a paint of the same formulation but without diatomite.

TABLE 5

Typical properties of selected diatomite functional additives from IMERYS as described in technical data sheets or brochures

| Product Grade | Celite 281 | DiaFil 525 | CelTix | DiaFil 530 | DiaFil 588 |
|---|---|---|---|---|---|
| Type | Flux calcined | Natural | Natural | Natural | Natural |
| Hegman (WM) | 1.0-2.0 | 1.0-2.0 | 2.0-3.0 | 2.5-3.5 | 3.0 |
| Median Particle Size | 9.2, 11.3, 17[2] | 11.0, 12.0[2] | 8.0, 11.0, 12.0[2] | 11.0 | 10.0 |
| Wet Sieve + 44 μm (%) | 1.5 | 1.0 | 1.0 | 0.5 | 0.3 |
| GCOA (%) | 125, 130, 140, 150[2] | 120 | 220, 240[2] | 120 | 120 |

| Product Grade | Celite 499 | DiaFil 570 | White Mist | Super Floss | Super Fine Super Floss |
|---|---|---|---|---|---|
| Type | Flux calcined | Natural | Flux calcined | Flux calcined | Flux calcined |
| Hegman (WM) | 3.5-4.5 | 3.5-4.5 | 5.0 | —[1] | —[1] |
| Median Particle Size | 7.0, 9.0, 14[2] | 9.0 | 7.0, 8.5[2] | 9.0 | 5.0 |
| Wet Sieve + 44 μm (%) | 0.1, 0.2 | 0.2 | trace, 0.1[2] | 0.2 | trace |
| GCOA (%) | 135, 140, 160, 185[2] | 120 | 140, 160[2] | 120 | 120 |

[1] No published Hegman values were found for these products.
[2] Different values were found in various brochures available.

In Table 8, we show the crystalline silica content of products currently in the public domain, as tested using the patent pending LH Method (test method) of EP Minerals, LLC. As the table shows, the natural products in the public domain contain non-detectable levels of cristobalite and quartz (in other words, such natural products are free of cristobalite content and quartz content). As tested using the LH Method, these natural products in Table 8 are free of total crystalline silica, whereas all of the flux calcined products of Table 8 that are in the public domain contain significant levels of crystalline silica primarily in the form of cristobalite.

TABLE 8

Crystalline silica content for commercial diatomite functional additives in the public domain

| Product Manufacturer | IMERYS | | | | |
|---|---|---|---|---|---|
| Sample ID | 26483 | 27627 | 27683 | 20022 | 22222 |
| Product Information | DiaFil 525 | CelTix | DiaFil 570 | Celite 281 | Celite 499 |
| Type | Natural | Natural | Natural | Flux calcined | Flux calcined |
| Quartz (wt %)[2] | N.D.[1] | N.D.[1] | N.D.[1] | <0.2 | N.D.[1] |
| Cristobalite (wt %)[2] | N.D.[1] | N.D.[1] | N.D.[1] | 44.7 | 40.0 |
| Total Crystalline Silica (wt%)[2] | N.D.[1] | N.D.[1] | N.D.[1] | 44.7 to <44.9 | 40.0 |

TABLE 8-continued

Crystalline silica content for commercial diatomite functional additives in the public domain

| Product Manufacturer | EP Minerals | | | | Dicalite | Ceca | |
|---|---|---|---|---|---|---|---|
| Sample ID | L18A161 | A21B14 | 21307 | 2D24A1F | 17801 | 17955 | 17956 |
| Product Information | CelaWhite | LCS-3 | MW27 | CelaBrite | SA-3 | Clarcel DIF D | Clarcel DIF N |
| Type | Natural | Natural | Flux calcined | Flux calcined | Natural | Flux calcined | Flux calcined |
| Quartz (wt %)[2] | N.D.[1] | N.D.[1] | N.D.[1] | N.D.[1] | 0.3 | N.D.[1] | N.D.[1] |
| Cristobalite (wt %)[2] | N.D.[1] | N.D.[1] | 74.0 | 51.6 | N.D.[1] | 77.0 | 80.4 |
| Total Crystalline Silica (wt%)[2] | N.D.[1] | N.D.[1] | 74.0 | 51.6 | 0.3 | 77.0 | 80.4 |

[1]Not-detected (N.D.)
[2]As determined under the LH Method.

SUMMARY OF THE DISCLOSURE

In accordance with one aspect of the disclosure, a product is disclosed that comprises diatomite, wherein the product is powdered. The product may have a Standard Sheen of 0.4 to 0.7 and a Hegman of 0.5 to 3.5. In an embodiment, the product may also have a Ratio (R) of 0.34 to 0.52. In any one of the embodiments above, the product may further have a Y value of 79 to 91, and an L* value of 91 to 97. In any one of the embodiments above, the product may further have an a* value of −0.1 to 1.2. In any one of the embodiments above, the product may further have a b* value of 1.0 to 5.0. In any one of the embodiments above, the product may further have a Standard Contrast Ratio of 0.90 to 0.92. In any one of the embodiments above, the product may further have a D50 of 19 to 36 and a D95 of 40 to 68. In any one of the embodiments above, the product may further have a Flatting Efficiency of 93% to 99%. In any one of the embodiments above, the product may be free of total crystalline silica content as measured according to an LH Method. In any one of the embodiments above, the product may be free of cristobalite content as measured according to an LH Method. In any one of the embodiments above, the product may be free of quartz content as measured according to an LH Method. In any one or the embodiments above, the diatomite may comprise flux calcined diatomite or may be flux calcined diatomite. Also disclosed is a method of using any one of the products above in a paint, a coating, a personal care product, a plastic film, a paper, a fiberboard, an elastomer, an adhesive, a caulk or a sealant.

In accordance with another aspect of the disclosure, a product is disclosed that comprises diatomite, wherein the product is powdered. The product may have a Standard Sheen of 0.4 to 0.5 and a Hegman of 1.0 to 2.0. In an embodiment, the product may further have a Ratio (R) of 0.35 to 0.52. In any one of the embodiments above, the product may further have a Y value of 79 to 91, and an L* value of 91 to 97. In any one of the embodiments above, the product may further have an a* value of −0.1 to 1.2. In any one of the embodiments above, the product may further have a b* value of 1.0 to 5.0. In any one of the embodiments above, the product may further have a Standard Contrast Ratio of 0.90 to 0.92. In any one of the embodiments above, the product may further have a D50 of 27 to 36 and a D95 of 58 to 68. In any one of the embodiments above, the product may further have a Flatting Efficiency of 96% to 99%. In any one of the embodiments above, the product may be free of total crystalline silica content as measured according to an LH Method. In any one of the embodiments above, the product may be free of cristobalite content as measured according to an LH Method. In any one of the embodiments above, the product may be free of quartz content as measured according to an LH Method. In any one of the embodiments above, the diatomite may include flux calcined diatomite or may be flux calcined diatomite. Also disclosed is a method of using any one of the products above in a paint, a coating, a personal care product, a plastic film, a paper, a fiberboard, an elastomer, an adhesive, a caulk or a sealant.

In accordance with another aspect of the disclosure, a product is disclosed that comprises diatomite, wherein the product is powdered. The product may have Standard Sheen of 0.6 to 0.7 and Hegman of 2.5 to 3.5. In another embodiment, the product may further have a Ratio (R) of 0.34 to 0.45. In any one of the embodiments above, the product may further have a Y value of 79 to 91, and an L* value of 91 to 97. In any one of the embodiments above, the product may further have an a* value of −0.1 to 1.2. In any one of the embodiments above, the product may further have a b* value of 1.0 to 5.0. In any one of the embodiments above, the product may further have a Standard Contrast Ratio of 0.90 to 0.92. In any one of the embodiments above, the product may further have a D50 of 19 to 24 and a D95 of 40 to 46. In any one of the embodiments above, the product may further have a Flatting Efficiency of 93% to 99%. In any one of the embodiments above, the product may be free of total crystalline silica content as measured according to an LH Method. In any one of the embodiments above, the product may be free of cristobalite content as measured according to an LH Method. In any one of the embodiments above, the product may be free of quartz content as measured according to an LH Method. In any one of the embodiments above, the diatomite may include flux calcined diatomite or may be flux calcined diatomite. Also disclosed is a method of using any one of the products above in a paint, a coating, a personal care product, a plastic film, a paper, a fiberboard, an elastomer, an adhesive, a caulk or a sealant.

DETAILED DESCRIPTION

Figure 1:
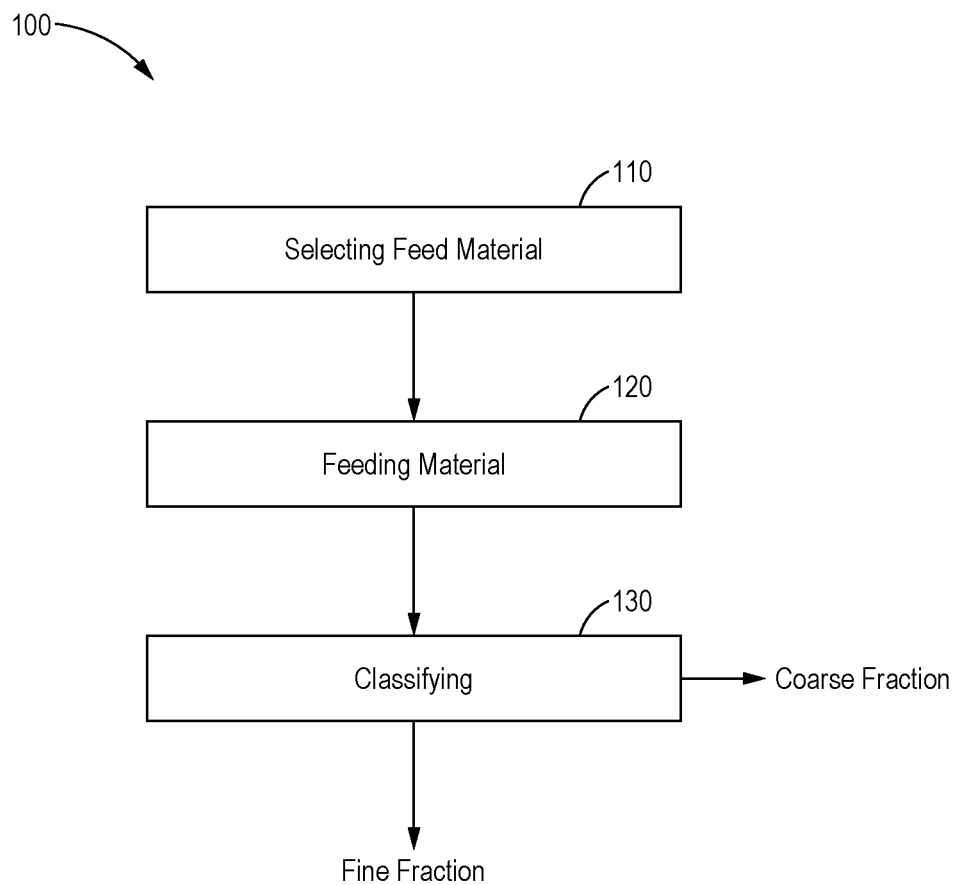
FIG. 1 illustrates an exemplary process flow diagram for making HEFAP.

This disclosure concerns functional additive products (for example, fillers, anti-block agents) that comprise diatomite. More particularly, it teaches Highly Effective Functional Additive Products (HEFAP) that comprise diatomite and which provide for reduced unit consumption, higher levels of sheen reduction and smoother surface feel at certain levels of sheen than is possible with diatomite products of the prior art. Such HEFAP may also possess high brightness, and low tint. HEFAP products may contain detectable or non-detectable levels of crystalline silica.

Disclosed herein is a product comprising diatomite, the product may have Standard Sheen of 0.4 to 0.7 and Hegman of 0.5 to 3.5; the product may also be powdered (or in powder form). In another embodiment, the product may also have a Ratio (R) of 0.30 to 0.52. In any one of the embodiments above, the product may further have one or more of the following: a Y value of 79 to 94; an L* value of 91 to 98; an a* value of −0.3 to 1.2; a b* value of 0 to 5.0; a Standard Contrast Ratio of 0.90 to 0.92; a D50 of 19 to 36; a D95 of 40 to 68; or a Flatting Efficiency of 93% to 99%.

Also disclosed herein is a product comprising diatomite, the product may have Standard Sheen of 0.4 to 0.5 and Hegman of about 1.0 to about 2.0 (preferably, 1.0 to 2.0); the product may also be powdered (or in powder form). In another embodiment, the product may also have a Ratio (R) of 0.30 to 0.52, or 0.35 to 0.52. In any one of the foregoing embodiments, the product may further have one or more of the following: a Y value of 79 to 94, 79 to 91 or 79 to 89; an L* value of 91 to 98, 91 to 97 or 91 to 95; an a* value of −0.3 to 1.2, or −0.1 to 1.2; a b* value of 0 to 5.0 or 1.0 to 5.0; a Standard Contrast Ratio of 0.90 to 0.92, or 0.90 to 0.91; a D50 of 27 to 36, or 28 to 35; a D95 of 58 to 68, or 59 to 67; or a Flatting Efficiency of 96% to 99%, or 96% to 97%.

Also disclosed herein is a product comprising diatomite, the product may have Standard Sheen of 0.6 to 0.7 and Hegman of about 2.5 to about 3.5 (preferably 2.5 to 3.5); the product may be powdered (or in powder form). In another embodiment, the product may also have a Ratio (R) of 0.30 to 0.45 or 0.34 to 0.45. In any one of the foregoing embodiments, the product may further have one or more of the following: a Y value of 79 to 94, 79 to 91, or 86 to 91; an L* value of 91 to 98, 91 to 97, or 92 to 97; an a* value of −0.3 to 1.2, −0.1 to 1.2, or −0.1 to 0.5; a b* value of 0 to 5.0, 1.0 to 5.0, or 1.2 to 3.3; a Standard Contrast Ratio of 0.90 to 0.92, or 0.90 to 0.91; a D50 of 19 to 24, or 20 to 23; a D95 of 40 to 46, or 41 to 46; or a Flatting Efficiency of 93% to 99%, or 94% to 95%.

In any one of the products or embodiments above, the product may be diatomite.

In any one of the embodiments above, the diatomite may include flux calcined diatomite or may be flux calcined diatomite.

In any one of the embodiments above, the product may be free of total crystalline silica content as measured according to the LH Method that distinguishes Opal-C content from cristobalite content.

In any one of the embodiments above, the product may be free of total cristobalite content as measured according to the LH Method that distinguishes Opal-C content from cristobalite content.

In any one of the embodiments above, the product may be free of quartz content as measured according to the LH Method.

Also disclosed is a method of using any one of the products above in a paint, a coating, a personal care product, a plastic film, a paper, a fiberboard, an elastomer, an adhesive, a caulk or a sealant.

As discussed earlier, diatomite functional additives, whether calcined, flux calcined or natural, have limitations for which the reasons are not understood. Heretofore, product with increased performance (such that unit consumption of the functional additive is lowered), desired tint and brightness have not been known. Further products with such characteristics that are free of detectable levels of crystalline silica have not been known.

Through research and careful investigation, inventors of the teachings herein discovered that the effectiveness of diatomite functional additives surprisingly is related to the particle size distribution of the diatomite functional additive, as opposed to other factors. In particular, research demonstrated that the particle size distribution of a powdered functional additive product comprising diatomite of particles of certain size ranges was more functionally effective than particles of other size ranges. After an extensive series of trials, the inventors developed products having particle size distributions that provide for novel ultra-low sheen, reduced unit consumption and smoother surface feel than provided by diatomite functional additives in the prior art.

This disclosure teaches the compositions comprising diatomite that were created by the inventors as a result of their extensive research and are called Highly Effective Functional Additive Products (HEFAP) herein. Such HEFAP will provide a significant benefit to industry because such products may be substituted for other functional additives, specifically functional additives that comprise DE, that require a much higher unit consumption and provide much lower levels of sheen reduction. HEFAP provides for reduced unit consumption, higher levels of sheen reduction and smoother surface feel at certain levels of sheen than is possible with diatomite functional additives of the prior art.

This disclosure also teaches one or more HEFAP products that comprise diatomite and either contain crystalline silica content or are free of total crystalline silica content. In an embodiment, the HEFAP product that comprises diatomite may have a non-detectable level of cristobalite and/or a non-detectable level of quartz. As used herein, when a product has a "non-detectable" level (or non-detected level) of a substance, the product is considered to be free of that substance.

The new products taught herein may have a Hegman in the range of about 0.5 to about 3.5, making them appropriate substitutes for diatomite functional additive products used in the highest volumes in industry. The data for the table for coatings containing the product, are all based on a standard paint formulation, which is shown below in Tables 6 and 7. The same amount of the diatomite products in the public domain, 6.7 wt % was added in every case, to the standard formulation. This allows for a comparison of the performance between the diatomite products of the public domain, as well as the functional additives that comprise diatomite of the present disclosure.

TABLE 6

Standard Paint Formulation

| Raw Material | Weight (g) |
|---|---|
| GRIND: | |
| Natrosol Plus 330 | 2 |
| Propylene glycol | 18 |
| Water | 155 |
| Nuosept 95 | 1 |
| KTPP | 2 |
| Drew Plus L 475 | 2 |
| Water | 53 |
| Tamol 850 | 5 |
| Tergitol NP-9 | 3 |
| AMP 95 | 3 |
| Tiona 595 | 150 |
| Minex 7 | 47 |
| Omya 2 | 110 |
| Water | 107 |

TABLE 6-continued

Standard Paint Formulation

| Raw Material | Weight (g) |
|---|---|
| Grind (≥800 RPM) to at least 5 Hegman | |
| HEFAP or other fillers in prior art that comprise DE | 67 |
| Grind (≥800 RPM) for 10 minutes | |
| LETDOWN: | |
| Rovace 9900 | 255 |
| Texanol | 13 |
| Acrysol TT 935 | 5 |
| Drewplus L-475 | 2 |
| Total | 1000 |
| Paint Properties: | |
| Pigment Volume Concentration (PVC) | 49 |
| Concentration of Solids (vol %) | 34.7% |
| Concentration of Solids (wt %) | 52.2% |
| Density (g/ml) | 1.363 |

TABLE 7

Materials for Standard Paint Formulation

| Raw Material | Producer/Supplier | Chemical Basis | Function |
|---|---|---|---|
| Natrosol Plus 330 | Ashland | Hydrophobically modified hydroxyethylcellulose | Rheology modifier |
| Propylene Glycol, >99.8% | Univar | Propane-1,2-diol | Freeze and thaw stability |
| Water | In house, deionized | $H_2O$ | Solvent |
| Nuosept 95 | Ashland | 50% Aqueous solution of non-metallic, non-chlorinated organic compounds | Preservative |
| KTPP | FMC Corporation | Potassium tripolyphosphate | Dispersant |
| Drew Plus L 475 | Ashland | Nonionic antifoam formulation comprised of a blend of mineral oils and silica derivatives | Foam control |
| Tamol 851 | Dow | Polyacid | Dispersant |
| Tergitol NP-9 | Dow | Nonylphenol ethoxylate | Surfactant |
| AMP 95 | ANGUS Chemical Company | 2-amino-2-methyl-1-propanol containing 5% added water | Dispersant |
| Tiona 595 | Cristal | Chloride-process rutile titanium dioxide | White pigment |
| Minex 7 | Unimin | Nepheline syenite | Extender |
| Omyacarb 2 | Omya | Calcium Carbonate | Extender |
| Fillers comprising DE (HEFAP or prior art) | EP Minerals, Imerys, Ceca | Amorphous, polycrystalline or crystalline silica | Matting agent |
| Rovace 9900 | Dow | Vinyl acrylic | Binder |
| Texanol | Eastman | Ester alcohol | Coalescent |
| Acrysol TT 935 | Dow | Hydrophobically modified anionic thickener | Rheology modifier |

Tables 9 and 10 show data for the products of the current disclosure for Hegman ranges of 1 to about 2 and from 2.5 to 3.5, respectively. As the tables show, the Standard Sheens (see 85° for Paint Properties in Standard Formulation) for these products are lower than for products in the public domain. Products in the Hegman range of 1 to about 2 have sheen values of 0.4 to 0.5 and products in the Hegman range of 2.5 to 3.5 have sheen values in the range of 0.6 to 0.7. The products also have narrow particle size distributions, high brightness and whiteness and contain non-detectable levels of total crystalline silica.

Use of the HEFAP that comprise diatomite in filled systems can provide for the following benefits: lower sheen if the HEFAP are substituted for traditional diatomite products in the public domain; or reduced unit consumption but equal sheen if the HEFAP are added in lower levels than the traditional diatomite products in the public domain.

Tables 11 and 12 show the impact on sheen of the coating of the standard formulation if HEFAP replaces the most effective flatting agent currently in the public domain, from a sheen reduction standpoint. As the tables show, through the use of HEFAP, unit consumption of diatomite functional additives, based on the Standard Formulation, can be reduced by 20% to 40%.

TABLE 9

Typical HEFAP examples comprising diatomite and having a Hegman fineness from 1.0 to about 2.0

| | Sample ID | 38800 | 38799 | 38992 | 39149 | 39146 | 38462 |
|---|---|---|---|---|---|---|---|
| Particle Size Distribution | D10 (μm) | 21.04 | 21.41 | 20.60 | 13.64 | 14.02 | 19.69 |
| | D50 (μm) | 33.45 | 34.85 | 32.04 | 28.75 | 30.36 | 31.74 |
| | D90 (μm) | 53.17 | 56.08 | 50.49 | 53.87 | 55.16 | 50.81 |
| | D95 (μm) | 62.55 | 66.62 | 59.33 | 65.80 | 66.79 | 59.92 |
| | SD (μm) | 11.93 | 12.80 | 11.09 | 14.72 | 15.65 | 11.54 |
| | R = SD/D50 | 0.36 | 0.37 | 0.35 | 0.51 | 0.52 | 0.36 |
| | Wet Sieve + 44 μm (%) | 5.3 | 6.3 | 3.0 | 7.8 | 12.0 | 4.4 |
| Hegman (WM)[1] | | 1.0 | 1.0 | 1.0 | 1.0 | 1.0 | 1.5 |
| CWD (g/ml) | | 0.30 | 0.31 | 0.31 | 0.33 | 0.33 | 0.34 |
| GCOA (%) | | 153 | 166 | 140 | 145 | 140 | 140 |
| Optical Properties | Y | 84.17 | 84.10 | 84.81 | 86.85 | 88.54 | 79.20 |
| | L* | 93.53 | 93.5 | 93.8 | 94.68 | 95.39 | 91.32 |
| | a* | 0.29 | 0.10 | −0.07 | −0.05 | 0.03 | 1.16 |
| | b* | 1.15 | 1.40 | 2.04 | 2.37 | 2.66 | 4.81 |
| Paint Properties in Standard Formulation | Standard Y | 87.26 | 87.01 | 87.11 | 87.62 | 87.75 | 88.06 |
| | Standard Contrast Ratio (Y) | 0.90 | 0.91 | 0.90 | 0.91 | 0.91 | 0.91 |
| | L* | 94.85 | 94.74 | 94.79 | 95.00 | 95.05 | 95.19 |
| | a* | −0.06 | −0.08 | −0.04 | −0.07 | −0.09 | −0.05 |
| | b* | 0.87 | 1.16 | 1.02 | 0.97 | 1.28 | 1.29 |
| | 20° | 1.3 | 1.3 | 1.3 | 1.3 | 1.3 | 1.3 |
| | 60° | 1.7 | 1.8 | 1.8 | 1.8 | 1.8 | 1.8 |
| | 85° (Std. Sheen) | 0.4 | 0.5 | 0.5 | 0.5 | 0.5 | 0.5 |
| | Flatting Efficiency (%)[2] | 97% | 96% | 96% | 96% | 96% | 96% |

TABLE 10

Typical HEFAP examples comprising diatomite and having a Hegman fineness from 2.5 to 3.5

| Sample ID | | 39148 | 38802 | 38993 | 39147 |
|---|---|---|---|---|---|
| Particle Size Distibution | D10 (μm) | 11.84 | 15.13 | 11.31 | 11.79 |
| | D50 (μm) | 21.59 | 22.85 | 20.03 | 20.54 |
| | D90 (μm) | 37.87 | 36.35 | 35.04 | 34.81 |
| | D95 (μm) | 45.89 | 42.99 | 42.33 | 41.76 |
| | SD (μm) | 9.67 | 7.83 | 8.77 | 8.50 |
| | R = SD/D50 | 0.45 | 0.34 | 0.44 | 0.41 |
| | Wet Sieve + 44 μm (%) | trace | 0.2 | trace | trace |
| Hegman (WM)[1] | | 2.5 | 3.0 | 3.0 | 3.5 |
| CWD (g/ml) | | 0.33 | 0.34 | 0.32 | 0.34 |
| GCOA (%) | | 151 | 149 | 140 | 136 |
| Optical Properties | Y | 87.64 | 81.64 | 86.11 | 90.64 |
| | L* | 95.01 | 92.42 | 94.36 | 96.23 |
| | a* | −0.06 | 0.49 | 0.00 | 0.00 |
| | b* | 1.65 | 3.27 | 1.20 | 2.17 |
| Paint Properties in Standard Formulation | Standard Y | 87.97 | 88.07 | 87.63 | 88.05 |
| | Standard Contrast Ratio (Y) | 0.91 | 0.90 | 0.91 | 0.91 |
| | L* | 95.15 | 95.19 | 95.00 | 95.18 |
| | a* | −0.08 | −0.09 | −0.05 | −0.09 |
| | b* | 1.00 | 1.17 | 0.90 | 1.25 |

TABLE 10-continued

Typical HEFAP examples comprising diatomite and having a Hegman fineness from 2.5 to 3.5

| Sample ID | 39148 | 38802 | 38993 | 39147 |
|---|---|---|---|---|
| 20° | 1.3 | 1.3 | 1.3 | 1.3 |
| 60° | 1.8 | 1.8 | 1.9 | 1.9 |
| 85° Standard Sheen | 0.6 | 0.7 | 0.7 | 0.7 |
| Flatting Efficiency (%) | 95% | 94% | 94% | 94% |

TABLE 11

An example of demonstrating the Sheen Parity Index for HEFAP that comprises diatomite. The HEFAP used here is Sample #38802

| Sample ID | 20023 | 39570 | 38802 | 38802 | 38802 |
|---|---|---|---|---|---|
| Product Information | Celite 499 Lompoc, CA | Celite 499 Quincy, WA | HEFAP | HEFAP | HEFAP |
| D95 (μm) | 42.87 | 35.29 | 42.99 | 42.99 | 42.99 |
| Hegman | 3.0 | 3.0 | 3.0 | 3.0 | 3.0 |
| DE Dosage (wt %) | 6.7% | 6.7% | 6.7% | 5.4% | 4.0% |
| Ratio of DE Dosage to that in Standard Formulation | 100% | 100% | 100% | 80% | 60% |
| 85° | 1.2 | 1.0 | 0.7 | 0.7 | 1.1 |

TABLE 12

An example of demonstrating the Sheen Parity Index for HEFAP that comprises diatomite. The HEFAP used here is Sample #38993.

| Sample ID | 20023 | 39570 | 38993 | 38993 | 38993 |
|---|---|---|---|---|---|
| Product Information | Celite 499 Lompoc, CA | Celite 499 Quincy, WA | HEFAP | HEFAP | HEFAP |
| D95 (μm) | 42.87 | 35.29 | 42.33 | 42.33 | 42.33 |
| Hegman | 3.0 | 3.0 | 3.0 | 3.0 | 3.0 |
| DE Dosage (wt %) | 6.7% | 6.7% | 6.7% | 5.4% | 4.0% |
| Ratio of DE Dosage to that in Standard Formulation | 100% | 100% | 100% | 80% | 60% |
| 85° | 1.2 | 1.0 | 0.7 | 0.7 | 1.0 |

TABLE 13

Crystalline silica content of selected HEFAP that comprise diatomite

| Sample ID | 38992 | 39146 | 39148 | 39149 | 38462 | 38802 | 38993 | 39147 |
|---|---|---|---|---|---|---|---|---|
| Hegman | 1.0 | 1.0 | 2.5 | 1.0 | 1.5 | 3.0 | 3.0 | 3.5 |
| Opal-C (wt %)[1] | 27.7 | 23.1 | 27.0 | 22.7 | 27.9 | 31.6 | 27.0 | 22.2 |
| Quartz (wt %)[3] | N.D.[2] | N.D.[2] | N.D.[2] | N.D2.[2] | N.D.[2] | N.D.[2] | N.D.[2] | N.D.[2] |
| Cristobalite (wt %)[3] | N.D.[2] | N.D.[2] | N.D.[2] | N.D.[2] | N.D.[2] | N.D.[2] | N.D.[2] | N.D.[2] |
| Total Crystalline Silica (wt %)[3] | N.D.[2] | N.D.[2] | N.D.[2] | N.D.[2] | N.D.[2] | N.D.[2] | N.D.[2] | N.D.[2] |

[1]Opal-C quantification is based on XRD Method as described in the LH Method of Lenz et al.
[2]Not-detected (N.D.)
[3]As determined under the LH Method.

Test Methods to Characterize the Highly Effective Functional Additive Products

The methods of characterizing the highly effective functional additive products of the present disclosure are described in detail in the section below.

Standard Sheen

The term "Standard Sheen" is used herein as a characteristic of a HEFAP that comprises diatomite or of another filler comprising diatomite. It is obtained by measuring the 85° sheen for a coating of a Standard Formulation. In other words, the 85° sheen value measured for the Standard Formulation incorporating the HEFAP (comprising diatomite) or another filler that comprises diatomite is considered the Standard Sheen measurement of the filler (HEFAP or other filler) as well as the Standard Sheen measurement of the Standard Formulation coating. One coating formulation was used for all fillers tested in this disclosure; this formulation is defined as the "Standard Formulation". The Standard Formulation is a specific waterborne latex paint formulation with a pigment volume concentration (PVC) of 49 and 34.7 vol % of total solids.

The raw materials and their concentrations in the Standard Formulation are listed in Tables 6 and 7. The dosage of fillers (that comprise diatomite) in the Standard Formulation is 6.7 wt %. Paint was made by mixing the raw materials in a container one by one following the order and concentrations in Table 6. A paint mixer equipped with a 4.1 cm-diameter mixer blade with "K" style Design A (The Paul N. Gardner Company) was used to agitate and well mix the materials. A U.S. 1-pint container (9.78 cm can height, 8.60 cm bottom flange diameter) or an HDX® 1-quart all-purpose mixing container (Home Depot) was used for containing the mixed materials. An agitation speed of at least 800 RPM during the grind phase was used to effectively wet and dis-agglomerate the dry pigments and stabilize them in an aqueous dispersion. After the pigment (Tiona® 595) and extenders (Minex® 7 and Omyacarb® 2) were added, the mixed materials were ground at at least 800 RPM to disperse the solids so that the ground materials showed a Hegman fineness value of 5 or above. It was observed that 10-15 minutes of grinding time was sufficient to disperse the pigment and extenders to 5 Hegman or above. After that, fillers comprising diatomite (HEFAP or fillers in the prior art) were added and another 10 minutes of grinding at at least 800 RPM was followed.

During the letdown phase, a lower agitation rate was used, in this case, 580 RPM. The letdown or thindown phase is usually the second step of the paint making process after the grind phase. In this phase, the viscous grind is diluted with the remaining formulation components, which are generally less viscous than the grind mix. Typically, the latex resins, any pre-dispersed pigments, and any other paint materials that only require mixing and perhaps moderate shear, are incorporated during the letdown phase. In this case, after the addition of all the remaining materials, another 10 minutes of agitation was followed to get a uniform paint. Then the paint was filtered through a 260 μm filter (Gerson Elite Paint Strainer System) to remove possible contaminants.

After paint was made, drawdowns were then prepared by casting sample paints at 76.2 μm (3 mil) wet film thickness onto a Leneta® Form 3B chart (Leneta Company) using a Bird-type applicator with 152.4 μm (6 mil) depth of cut and 150 mm film width (The Paul N. Gardner Company). Drawdowns were made manually with a smooth uniform motion, at the rate of about 6 cm/s. The paper charts were held flat on a glass plate while making drawdowns Immediately after application, the drawdown was placed horizontally in a well-ventilated dust-free hood, with all drawdowns in close proximity to one another to assure identical drying conditions and was allowed to dry a minimum of 40 hours at room temperature (23±3° C.) before testing. No attempt was made to control the humidity in the hood. According to the National Oceanic and Atmospheric Administration, the yearly average relative humidity is 50.7% in the region where all the measurements on Standard Sheen were conducted (Reno, Nev.), ranging from 36.2% in July to 68.0% in January. However, the change in relative humidity did not show an observable effect on measurements of Standard Sheen.

After drying of the drawdowns, Standard Sheen values were then measured according to the procedure in American Society of Testing and Materials (ASTM) Method D523 Standard Test Method for Specular Gloss. The method is summarized as below. Gloss or sheen of a surface refers to the light reflectivity of that surface at specific incident angles including 20°, 60°, and 85° geometry. The 85° geometry is used for comparing specimens for sheen or near-grazing shininess. It is most frequently applied when specimens have 60° gloss values lower than 10. In this invention, the Standard Sheen (85° geometry) values were measured using a gloss meter (Micro-TRI-Gloss® 4520, Byk-Gardner, USA). The gloss meter was calibrated against a highly polished, plane, black glass at the start and completion of every period of gloss meter operation, and during the operation at sufficiently frequent intervals to assure that the instrument response was practically constant. The glass standard used for this gloss meter had assigned values of 92.7, 95.2, and 99.4 for the 20, 60, and 85° geometries, respectively. After calibration, Standard Sheen values were then measured on the film applied on the white area of the paper charts. For each drawdown, sheen was measured at a minimum of three locations to one decimal place and the average value was calculated to the same and reported here. It must be pointed out that an extremely good repeatability and reproducibility was observed by the inventors in Standard Sheen measurements. For example, in the 0.4-0.9 Standard Sheen range, which is of interest, virtually no difference or 0.1-unit difference was observed for multiple measurements of Standard Sheen at different locations on a drawdown. Also, in the 0.4-0.9 Standard Sheen range, no difference was observed for measured Standard Sheen for sample paints made at a different time by the same personnel using the same filler that comprised diatomite. Furthermore, in the 0.4-0.9 Standard Sheen range, no difference was observed for measured Standard Sheen for sample paints made by different personnel using the same filler that comprised diatomite. The extremely good repeatability and reproducibility of Standard Sheen measurements help better demonstrate the effectiveness of HEFAP (comprising diatomite) in flatting compared to other fillers comprising diatomite in the prior art.

When a HEFAP (comprising diatomite) or another filler comprising diatomite is used in a coating of the Standard Formulation, the value of the Standard Sheen is used to characterize the HEFAP or other filler utilized in the Standard Formulation, although technically it is the Standard Formulation coating for which the Standard Sheen is measured.

Sheen Parity Index

The Sheen Parity Index is used to demonstrate the relative effectiveness of the HEFAP in sheen reduction, relative to the most effective products of the products already in the public domain. While the dosage of filler (comprising DE) in the Standard Formulation was 6.7 wt %, reduced dosage of the HEFAP (that comprise diatomite) was also used to explore the level of dosage at which such products in this disclosure would have similar sheen values to products in the public domain with similar Hegman fineness. The ratio of this reduced dosage of HEFAP to the 6.7 wt % in the Standard Formulation is thus defined as the Sheen Parity Index. A Sheen Parity Index of 100 indicates that the two materials being compared are equally effective in sheen reduction when equal amounts of material are used. When the Index is less than 100, it indicates that a lesser amount of HEFAP provides the same level of sheen reduction as the standard 6.7% addition level of the prior art. The procedure of making paint with reduced dosage of HEFAP and measuring its sheen was the same as described in the "Standard Sheen" section except that the Standard Formulation was modified with reduced dosage levels of HEFAP.

Flatting Efficiency

Another term defined to demonstrate the effectiveness of the HEFAP disclosed herein in sheen reduction was "Flatting Efficiency". Flatting Efficiency is calculated as:

$$\text{Flatting Efficiency} = 100 * \frac{S_{ref} - S_{DE}}{S_{ref}}$$

where $S_{ref}$ is the 85° sheen for a paint without a functional additive (filler) comprising DE and $S_{DE}$ is the 85° sheen for the same paint but with a functional additive (filler) that comprises DE incorporated. In this case, the $S_{ref}$ refers to the sheen of a modified Standard Formulation that is free of functional additives (fillers) that comprise DE (the "Modified Standard Formulation"), which was measured to be 11.9. Each of the $S_{DE}$ was measured with the Standard Formulation containing the functional additive (filler) of interest that comprises DE. The procedure of making paint free of functional additives (fillers) that comprise DE and measuring its sheen was the same as described in the "Standard Sheen" section except that the Standard Formulation was modified to contain no DE.

Flatting Efficiency is a measure of the amount by which a functional additive (filler) reduces the sheen of a coating. A Flatting Efficiency of 100, which indicates that 100% of the sheen was eliminated by using the functional additive (filler), is the highest value that can be achieved. The Flatting Efficiency is considered a characteristic of the functional additive (filler) even though Flatting Efficiency measures the amount by which the functional additive (filler) reduces the sheen of a coating.

Brightness, Color, and Standard Contrast Ratio for the Paint with Standard Formulation The optical properties of the paint with Standard Formulation incorporating various fillers that comprise diatomite were characterized using the color space defined by the Commission Internationale de l'Eclairage (CIE), as the L*a*b* color space. The "L*" coordinate is a measure of reflected light intensity (0 to 100). The L* represents the darkest black at a value of 0, and the brightest white at a value of 100. The "a*" coordinate is the degree of redness (positive value) or greenness (negative value), while the "b*" coordinate is the degree of yellowness (positive value) or blueness (negative value).

In addition to the L*a*b* color space, CIE previously developed a chromaticity coordinate system (Yxy) that is still used in defining the brightness and chromaticity of products. The "Y" value ranges from 0 to 100 and is the luminance or brightness factor, where the brightest white is indicated by a value of 100.

In this disclosure the optical properties (L*a*b* and Y) of samples were measured using a Konica Minolta® Chroma Meter CR-400. The Chroma Meter was calibrated using a calibration plate with 86.05 Y, 0.3187 x, and 0.3358 y at the start of every period of chroma meter operation. For clarity herein when reporting measured values for the examples and in claiming, the luminance or brightness factor for the filler product (that comprises HEFAP comprising DE or another filler comprising DE) is referred to as a Y value in the tables disclosed herein and in the claims, whereas when the luminance or brightness factor is measured for a coating of the Standard Formulation it is referred to as the Standard Y (value). The same dried drawdowns used for measuring the Standard Sheen were used for measuring the L*a*b* and Standard Y values for the coating (paint) of the Standard Formulation. Measurements were done on the film on the white area of the paper charts, at a minimum of three locations, reading to two decimal places for (Standard Y), L*, a*, and b*, and calculating mean values to the same. The drawdowns were placed over a white surface while measurements were being made.

The Contrast Ratio is a measure of the opacity of a paint or how well a paint "hides" the underlying film or substrate. High Contrast Ratio is often desirable to reduce the number of coatings required to complete a paint job to the customer's satisfaction. The detailed description of Contrast Ratio measurements can be found in ASTM Method D2805 Standard Test Method for Hiding Power of Paints by Reflectometry. Contrast Ratio is calculated by dividing the Standard Y value measured on the film applied on the black area of the Leneta chart by the Standard Y value measured on the film on the white area:

$$\text{Contrast Ratio} = \frac{\text{Standard } Y_{black\ area}}{\text{Standard } Y_{white\ area}}$$

The procedure of measuring the Standard Y value on the film applied on the black area of the Leneta chart was like that on the white area as described above, except that the drawdowns were placed over a black surface while measurements were being made. The Contrast Ratio value measured for the Standard Formulation incorporating HEFAP (comprising diatomite) or another filler comprising DE is thus defined as the "Standard Contrast Ratio". When a HEFAP (comprising diatomite) or another filler comprising diatomite is used in a coating of the Standard Formulation, the value of the Standard Contrast Ratio is used to characterize the HEFAP or other filler utilized in the Standard Formulation, although technically it is the Standard Formulation coating for which the Standard Contrast Ratio is measured. In other words, the Standard Contrast Ratio measured for the Standard Formulation incorporating HEFAP (comprising diatomite) or another filler that comprises diatomite is considered the Standard Contrast Ratio measurement of the filler (HEFAP or other filler) as well as the Standard Contrast Ratio measurement of the Standard Formulation coating.

Particle Size

Particle size (diameter) was measured using a laser diffraction analyzer (Microtrac® S3500, Microtrac, USA) that can measure both spherical and non-spherical particle sizes in the range of 0.02 to 2800 microns. Wet measurements were used with distilled water as the liquid and with sonication. Particle size was reported using D5, D10, D50, D90, or D95 values in which a given D-value corresponds to the particle size at which a certain percentage (5%, 10%, and so forth) are below that particle size. The median particle size (D50) is identified as the particle size at which 50% of the sample particles have a diameter equal to or less than that value.

Particle Size Distribution of Functional Additives Comprising Diatomite

The particle size distribution (PSD) of the fillers comprising diatomite was determined using a laser diffraction instrumentation that employs the Mie scattering theory. Microtrac model S3500 employing dynamic light scattering, and equipped with three stationary lasers, two detectors, and ultrasonic dispersion was used for the analysis. Briefly a small amount of the sample (a pinch of the sample) was placed in the sample cell in the Microtrac where it was dispersed using gentle ultrasonication for 10 seconds. Following, a laser was shone on the particles and the scattered light from particles was collected at the detector. The scattering intensities were analyzed using an auto-correlator function and the translational diffusion coefficient was determined which was used to determine the particle size distribution. A refractive index of 1.48 was used for filler samples comprising diatomite and were treated as transparent particles with irregular shape. The PSD of different product samples is reported herein on volume basis with median particle size (D50) and particle size at different percentile including D10, D90, and D95, along with the standard deviation (SD) of the PSD.

Wet Sieve Analysis (+44 μm) of Functional Additives Comprising Diatomite

The wet sieve analysis provides an accurate measure of the mass of particles within a powder sample, coarser than, or finer than a specific point in the distribution. In this test, a powder sample of known mass on dried basis was placed on a test sieve with a Tyler mesh opening of 325 mesh (44 μm). The sample was washed through the sieve using a water spray until the underflow through the screen was clear. The screen oversize residue (material coarser than the sieve opening) was collected, dried in an oven at 110° C. (230° F.), and weighed. The mass of the dried residue divided by the original mass of the test sample gives a measure of the percentage of particles larger than the sieve size.

Hegman Fineness of Functional Additives Comprising Diatomite

The Hegman gauge and test method are described in detail in the ASTM Method D1210 Standard Test Method for Fineness of Dispersion of Pigment-Vehicle Systems by Hegman-Type Gage. The Hegman gauge and associated test method provide a measure of the degree of dispersion or fineness of grind of a pigment (or other functional additive powder) in a pigment-vehicle system. It is used to determine if a functional additive is of an appropriate size to embody the finished film (paint or plastic) with desired surface smoothness and other properties. Hegman values range from 0 (coarse particles) to 8 (extremely fine particles) and are related to the coarser end of the particle size distribution of the sampled powder. The gauge itself is a polished steel bar into which a very shallow channel of decreasing depth is machined. The channel is marked on its edge with gradations corresponding to Hegman values (0 to 8). In this disclosure, 2 g of dry representative powder sample was dispersed within 12 g of a liquid vehicle (corn oil) using hand mixing. A small quantity of the suspension was poured across the deep end of the channel at the top and a scraper was then used to draw the suspension toward the shallow end of the channel along the grooves of the channel. The suspension fills the tapered grooves. The channel of the gauge was then visually inspected in reflected light, and the point at which the suspension first showed a speckled pattern corresponded with the measured Hegman fineness value.

Centrifuged Wet Density of Functional Additives Comprising Diatomite

Various methods have been used in the past to characterize the wet density of products comprising diatomite. The method used in this disclosure is the centrifuged wet density (CWD) which has been used frequently in the prior art, such as the method described in U.S. Pat. No. 6,712,898 by Palm et al. In this method, 10 ml of deionized water was first added to a 15-ml centrifuge glass tube and a powder sample of known dried weight (1-2 g) was loaded into the tube. The sample was completely dispersed in the water using a Vortex-Genie® 2 vibrator. A few milliliters of water were then used to rinse the sides of the tube to ensure all particles are in suspension and the contents brought up to the 15 milliliters mark. The suspension was then centrifuged under specific conditions, i.e. 5 minutes at 2680 RPM on an International Equipment Company Centra® MP-4R centrifuge, equipped with a Model 221 swinging bucket rotor. After centrifugation, the volume level of the settled solids was noted by reading off at the graduated mark. The CWD of the sample was then calculated as the weight of the dried sample used in the test divided by the measured volume of the settled material in g/ml. A conversion factor of 62.428 is applied to obtain the centrifuge wet density in $lb/ft^3$.

Gardner Coleman Oil Absorption of Functional Additives Comprising Diatomite

The Gardner Coleman Oil Absorption (GCOA) test determines the absorptive capacity of powder samples. The test gives an indication of unit mass of liquid absorbed per unit mass of solid powder. In this disclosure, corn oil was titrated into a known mass of powder via a burette while the powder was gently worked until a visual end-point was reached (i.e. the powder "glistens"). The GCOA of the sample was then calculated based on the mass of liquid used to saturate the known mass of powder.

The GCOA is then calculated by:

$$GCOA = \frac{100(SG)(V)}{M}$$

where SG is specific gravity of liquid used; V volume of liquid used, and M mass of sample used.

Brightness and Chromaticity of Functional Additives Comprising Diatomite

Optical properties (L*a*b* and Y) of fillers comprising DE were characterized using a Konica Minolta® Chroma-meter CR-400. A dry representative sample (approximately 2 g or enough to cover the measuring tip of the meter) was spread on white paper and pressed with a flat surface to form a packed smooth powder surface. The Chroma Meter was pressed on the powder and the readings were noted. The results of the optical tests for various highly effective diatomite functional additive products are shown in the ensuing product examples. The Chroma Meter was calibrated using a calibration plate with 86.05 Y, 0.3187 x, and 0.3358 y at the start of every period of Chroma Meter operation.

Bulk Chemistry of Functional Additives Comprising Diatomite

The bulk chemistry or elemental analysis of a material can be determined using wavelength-dispersive x-ray fluorescence spectroscopy (WD-XRF). A Bruker® S4 Explorer WD-XRF spectrometer or a Bruker S8 Tiger WD-XRF were used to determine the bulk chemistry of samples described herein.

Loss on Ignition of Functional Additives Comprising Diatomite

The loss on ignition (LOI) test provides an estimate of the volatile content (by mass) of dried diatomite or other materials. The test is performed by measuring the mass of a dried sample before and after heating at 1000° C. for at least one hour. This test gives an approximate measure of the water of hydration content of a DE sample or a sample comprising DE.

First, samples are dried to remove moisture by placing each sample into a metal pan. The pan containing the sample was then placed into an oven at a set temperature of 110-130° C. (230-266° F.) for two to eight hours. For some samples, the dried sample is ball-milled for 10 minutes with ceramic media in a ceramic jar. Following, about 0.3-1.0 gram of the dried, milled sample is placed into a previously ignited (at a temperature greater than about 1000° C. (1832° F.)) ceramic crucible of known mass. The crucible containing the sample is then "ignited" by placing it into a muffle furnace for one hour at about 1000° C. (1832° F.). After, the crucible is removed, allowed to cool for two to five minutes on a heat-resistant surface, and then transferred to a desiccator. Once cooled to room temperature (about 22° C. (72° F.)), the crucible containing the sample is reweighed. The LOI is then calculated by dividing the difference between the crucible and sample mass before and after burning by the sample mass according to:

LOI, wt %=100$(m_{cs,i}-m_{cs,f})/m_d$ where $m_{cs,i}$=mass of the previously ignited crucible and the dried sample, $m_{cs,f}$=mass of the previously ignited crucible and the sample post-ignition, and $m_d$=mass of the previously dried sample.

Crystalline Silica Content of Functional Additives Comprising Diatomite

The "LH Method" as described in Lenz et al. (PCT/US18/014514) is used for crystalline silica analysis of samples reported in this disclosure. The LH Method is also described in PCT/US2016/037830, of which Lenz is also an inventor. In Lenz et al., differentiation between opal-C and opal-CT was not attempted. If both phases are present, they are treated collectively as if they were part of one phase. Hence, the term "Opal-C" is used in the present disclosure to mean opal-C and/or opal-CT, unless indicated otherwise by the context in which it is used.

According to Lenz et al., one relatively simple way to confirm the absence of cristobalite within a sample is to spike the sample (add a known amount of) with cristobalite standard reference material (i.e. National Institute of Standards and Technology (NIST) Standard Reference Material 1879a), run X-ray Diffraction (XRD) analysis on the spiked sample and then compare the original un-spiked sample diffraction pattern with the spiked sample pattern. If the spiked sample diffraction pattern simply increases the intensity of the primary and secondary peaks but does not show a position shift or show additional peaks, then the original sample most likely contains cristobalite. If the primary peak shifts and becomes sharper (or resolves into two separate peaks), and secondary peaks appear or become much better defined, then Opal-C (opal-C and/or opal-CT) and not cristobalite is present in the original sample.

In summary, to determine whether a sample of a product that includes diatomite contains cristobalite or Opal-C (opal-C and/or opal-CT) and then to quantify the Opal-C (opal-C and/or opal-CT) and/or crystalline silica content involves several steps according to the LH Method.

It may be determined whether the sample contains water of hydration via high temperature LOI testing. For example, a (representative) first portion of the sample may be obtained and LOI testing may be performed on such first portion.

Bulk powder X-ray Diffraction is performed, and the resulting (first) diffraction pattern inspected. For example, preferably, a (representative) second portion of the sample is obtained and bulk powder XRD is performed on the second portion. Preferably, the second portion is milled prior to XRD. The resulting (first) diffraction pattern is analyzed for the presence or absence of Opal-C (opal-C and/or opal-CT) and cristobalite. The resulting (first) diffraction pattern may also be analyzed for the presence or absence of other crystalline silica phases (for example, quartz and tridymite) within the (representative) second portion of the sample. If the (first) diffraction pattern is obviously indicative of Opal-C (opal-C and/or opal-CT), then further analysis is not required to determine whether the sample contains cristobalite or Opal-C (opal-C and/or opal-CT). The Opal-C (opal-C and/or opal-CT) diffraction pattern differs from that of α-cristobalite in the following ways: the primary peak (22°) and the secondary peak (36°) are at higher d-spacing (lower 2θ angle), there is a broader primary peak for Opal-C (opal-C and/or opal-CT) as measured using the "Full Width at Half Maximum" (FWHM) statistic, Opal-C (opal-C and/or opal-CT) has poorly-defined peaks at 31.50° and 28.49° 2θ, and a much more significant amorphous background.

If the (first) diffraction pattern is questionable regarding whether Opal-C (opal-C and/or opal-CT) and/or cristobalite is present, then according to the LH Method a second XRD analysis is performed to determine whether Opal-C (opal-C and/or opal-CT) and/or cristobalite is present. This time the analysis is performed on, preferably, another representative portion of the sample spiked with cristobalite standard reference material (NIST 1879a). For example, a (representative) third portion of the sample is obtained and then spiked with cristobalite standard reference material (NIST 1879a) and XRD is performed on the third portion. The resulting (second) diffraction pattern from the XRD on the third portion is analyzed. Preferably, the third portion is milled prior to XRD. If the original sample (for example, the representative second portion of) comprises Opal-C (opal-C and/or opal-CT), the cristobalite spike significantly modifies the diffraction pattern (from that of the second portion) with additional peaks identifiable at 22.02° and 36.17° 2θ, along with more prominent peaks at 31.50° and 28.49° 2θ seen in the (second) diffraction pattern of the third portion. If the original sample (more specifically, the second portion of) comprises cristobalite, then addition of the cristobalite spike (to the third portion) only results in increased peak intensity and no other significant change from the (first) diffraction pattern of the second portion (as seen in the (second) diffraction pattern of the third portion).

Quantifying the Opal-C (opal-C and/or opal-CT) content of a diatomite sample can be complicated as its diffraction pattern is a combination of broad peaks and amorphous background, and diatomite products often contain other amorphous phases in addition to opal. According to the LH Method, an estimate of the quantity is obtained by treating the Opal-C (opal-C and/or opal-CT) peaks (collectively, if both phases are present) of the first diffraction pattern as if they are cristobalite and quantifying against cristobalite standards such as NIST 1879a. This method of quantification of Opal-C (opal-C and/or opal-CT), which Lenz et al. call the XRD Method, will usually underestimate the Opal-C (opal-C and/or opal-CT) content but is effective for a few purposes, such as manufacturing quality control. According to Lenz et al., this XRD Method is part of the umbrella LH Method. Alternatively (under the LH Method), a measure may be obtained by heating a representative portion of the sample (for example, a fourth portion) at very high temperature (e.g., 1050° C.) for an extended period (for example 24 to 48 hours) until that heated portion is fully dehydrated. This completely dehydrates opaline phases and forms cristobalite (reduces amorphous background component). XRD analysis is then performed on the fourth portion and the cristobalite in the resulting (third) diffraction pattern of the fourth portion can be quantified against the cristobalite standards to give an estimate of original Opal-C (opal-C and/or opal-CT) content. Preferably, the fourth portion is milled prior to XRD. As long as additional flux is not added prior to heating the fourth portion, and the temperature kept below 1400° C., any quartz present in the fourth portion will not be converted to cristobalite.

To obtain the total crystalline silica content wt % of the sample according to the LH Method, the weight percentage of the identified cristobalite (if any), the weight percentage of the quartz (if any) and the weight percentage of tridymite (if any) are added together to calculate the total weight percentage of the crystalline silica content in the sample. To obtain the weight percentage of quartz or tridymite found to be present during the analysis of the (first) diffraction pattern of the second portion of the sample, each of quartz or tridymite may be compared to its respective standard (for example, NIST SRM 1878b for quartz) for quantification of the content, or be quantified through the use of an internal standard (such as corundum) and applicable relative intensity ratios. If it is determined by the LH Method that cristobalite is present, the cristobalite seen in the (first) diffraction pattern of the second portion of the sample, may be compared to its respective standard (for example NIST 1879a) for quantification of the content, or be quantified using an internal standard (such as corundum) and applicable relative intensity ratios. In the unusual case where there is both Opal-C (opal-C and/or opal-CT) and cristobalite present and the primary peak of the opal-C and/or opal-CT cannot be differentiated or de-convoluted from that of cristobalite, the Opal-C (opal-C and/or opal-CT) and cristobalite are quantified as one phase and reported as cristobalite. The quantity of cristobalite thus reported will be higher than the actual quantity in the sample. Because the sample is a representative sample of the product, the total weight percentage of the crystalline silica content in the sample is considered to accurately represent the total weight percentage of the crystalline silica content in the product from which the sample was taken.

XRD scans presented herein was performed using a Siemens® D5000 diffractometer controlled with MDI™ Datascan5 software. This diffractometer was equipped with Cu Kα, sample spinning, graphite monochromator, and scintillation detector. Power settings were at 50 KV and 36 mA, with step size typically at 0.02° and 6 seconds of dwell time. JADE™ (2010) software was used for analyses of XRD scans. Sample preparation included SPEX® milling in zirconia vials with zirconia grinding media. Corundum was added into the samples as internal standard to calibrate the instrument.

The LH Method has a detection limit as low as 0 wt % to 0.5 wt % for crystalline silica phases such as cristobalite, quartz or tridymite in products that comprise diatomite, depending on the mineralogy of the DE. For example, under the LH Method, the detection limit for cristobalite in a sample comprising diatomite may be as low as 0 wt % to 0.5 wt % (depending on the mineralogy of the DE). Similarly, under the LH Method, the detection limit for quartz in a sample comprising diatomite may be as low as 0 wt % to 0.5 wt % (depending on the mineralogy of the DE). As used herein the term "detection limit" means the lowest quantity of a substance in (a sample of) a material that can be distinguished (by the test method) from absence of that substance in (the sample of) the material. Thus, when the cristobalite content of a product is shown as N.D. (not-detected) when tested using the LH Method (see for example, Tables 8, 13, 14 and 15), no cristobalite was detected by the LH Method in the sample of the material. Likewise, when the quartz content of a product is shown as N.D. (not-detected) when tested using the LH Method (see for example, Tables 8, 13, 14 and 15), no quartz was detected by the LH Method in the sample of the material.

Methods for Preparing the Highly Effective Functional Additive Products with Controlled Particle Size Distribution As the porosity and the resulting effective low density of diatomite provides for buoyancy in liquid systems, this allows for the use of larger diatomite particles in paint and coatings systems than is possible for most other inorganic particulate materials, which are denser and are more prone to settling. The larger size of the DE particles and their irregular surface structure have been thought to contribute to the effectiveness of diatomite products as flatting and matting agents in paint and coatings. The Hegman fineness has been widely used in the paint and coatings industry to measure the surface smoothness or the degree of dispersion (commonly referred to as "fineness of grind") of both a functional additive product and a coating product and to help identify functional additive products suitable for target coating properties. Generally, two functional additive products for coatings should have similar Hegman values in order to be considered possibly interchangeable.

While DE fillers with various Hegman fineness have been used in the industry for a long time, improvements to the effectiveness in flatting of products at certain Hegman finenesses is desired as is the creation of more cost-effective products. The inventors have developed a theory to correlate the effectiveness of fillers comprising diatomite with their particle size distribution. Specifically, they theorized that, within the particle size distribution of a powdered functional additive product that comprises diatomite, particles of certain size ranges are more functionally effective than particles of other size ranges. Through an extensive product development and series of product trials, the inventors developed HEFAP comprising diatomite that have particle size distributions that provide for novel ultra-low sheen, reduced unit consumption and smoother surface feel than provided by products taught by the prior art. The inventors also learned from the teachings in Lenz, et al, in (PCT/US18/014514), and made such HEFAP containing non-crystalline silica.

In particular, the HEFAP disclosed herein were made by maximizing the top size, as indicated by D95, as allowed at a certain Hegman fineness while minimizing the width (spread) of particle size distribution (PSD) as indicated by the Ratio (R) of the standard deviation to the median particle size (D50). The inventors focused on two Hegman ranges, about 1.0 to about 2.0 (preferably, 1.0-2.0), and about 2.5 to about 3.5 (preferably, 2.5-3.5). It was found that a careful selection of feed materials with certain characteristics followed by processing to control particle size distribution in a certain way produced the HEFAP.

To prepare HEFAP that are free of crystalline silica (no crystalline silica content was detectable), careful section of ores with the appropriate chemistry is followed by appropriate flux calcination with lower soda ash addition and lower temperature in comparison with the conditions used to produce conventional products which contain crystalline silica.

HEFAP comprising diatomite can be prepared by several methods. FIGS. 1-4 disclose different exemplary methods used to prepare various exemplary HEFAP. FIG. 1 illustrates an exemplary process 100 that utilizes 1-step air classification to prepare an exemplary HEFAP having a Hegman of about 1.0 to about 2.0 (preferably, 1.0-2.0), or about 2.5 to about 3.5 (preferably, 2.5-3.5).

In block 110 (see also block 210, 310 and 410), feed material is selected. The feed material comprises diatomite. In preferred embodiments, the feed material may be diatomite. The diatomite may comprise flux calcined diatomite or may be flux calcined diatomite.

The feed material may have a Y value in the CIE Yxy color space in the range of, 80 to 100, preferably, in the range of 87-94. The feed material may have a b* value in the L*a*b* color space in the range of 0 to 5, preferably, 0 to 4. The feed material may have a D50 in the range of 15-70 µm, preferably, in the range of 25-40 µm. The feed material may have an L* value in the range of 89-100, preferably, in the range of 95-98. The feed material may have an a* value in the range of −0.7-1.6, preferably, in the range of −0.3-1.0. With regard to the feed material, the Ratio (R) of SD to D50 may be in the range of 0.3-1.3, preferably, in the range of 0.6-1.3.

The process 100 to make HEFAP tends to reduce the brightness and increase the tint of feed material, thus in a preferred embodiment, the feed material comprises a diatomaceous earth that has a high brightness (Y value of 87 to 94) and low tint (b* value of 0 to 4). Such brightness and tint values can be found in flux calcined diatomite. However, while the optical properties of a material may be within a desired range for a feed material, if the material does not contain enough particles within the desired PSD of the HEFAP to be produced, the material may be unacceptable for use as a feed material. For example, a feed material comprising a coarser flux calcined diatomite, such as FW40 (EP Minerals' product), may be too coarse to contain particles with the desired PSD range for Hegman 2.5 to 3.5. Product development by the inventors showed that the feed material should have a D50 of 15-70 µm, preferably, in the range of 25-40 µm.

In block 120, the feed material is fed into an air classifier via a volumetric feeder such as a Schenckprocess® AccuRate 304, or the like. Preferably, the feeder rate setting of the volumetric feeder is 100 L/h to 200 L/h, which was measured to be (520 g/h to 1.4 kg/h for the feed material used in this disclosure) and the agitation rate is about 300 to about 400.

In block 130, the feed material may be classified by an air classifier, such as a Comex ACX-50 classifier or other similar classifier. The Comex ACX-50 classifier is equipped with high speed classifying system that includes a separator stage and a cyclone stage. In the exemplary process 100 that utilizes 1-step air classification to produce HEFAP, the fine fraction output by the classifier is the HEFAP product. The classifying air injected into the classifier flows inwards through the classifier and discharges the fine fraction (of the material). In a classifier such as the Comes ACX-50 that utilizes a separator stage followed by a cyclone stage, the fine fraction output by the separator (of the classifier) flows into the cyclone (of the classifier); the resulting fine fraction (fine particles with D95 of 55-67 µm, preferably, 59-67 µm and the Ratio (R) of 0.30 to 0.52, or with D95 of 41-46 µm and the Ratio (R) of 0.30 to 0.45) output from the cyclone is the HEFAP with Hegman of 1.0-2.0 or 2.5-3.5, respectively. The coarse fraction rejected by the classifier leaves through a coarse material outlet and may be considered a by-product or a waste product of the exemplary process 100 of FIG. 1. As disclosed below, parameters such as classification speed and air flow pressure may be varied to achieve the desired products.

To generate a HEFAP, which has (1) a Hegman of about 1.0 to about 2.0 (preferably, 1.0-2.0), and (2) a Standard Sheen value of 0.4 to 0.5, the classification speed may be about 3000 RPM to about 4500 RPM, and the airflow may be 25 to 55 m³/h, preferably 45 m³/h. In an embodiment, the HEFAP may further have one or more of the following: a Ratio (R) of 0.30 to 0.52, preferably 0.35 to 0.52; a Y value of 79 to 94, preferably 79 to 91; an L* value of 91 to 98, preferably 91 to 97; an a* value of −0.3 to 1.2, preferably −0.1 to 1.2; a b* value of 0.0 to 5.0, preferably 1.0 to 5.0; or a Standard Contrast Ratio of 0.90 to 0.92.

To generate a HEFAP, which has (1) a Hegman that is about 2.5 to about 3.5 (preferably, 2.5-3.5) and (2) a Standard Sheen value of 0.4 to 0.5, the classification speed may be about 5000 RPM to about 7000 RPM, and the airflow may be 25 to 55 m³/h, preferably 45 m³/h. In an embodiment, the HEFAP may further have one or more of the following: a Ratio (R) of 0.30 to 0.45, preferably 0.34 to 0.45; a Y value of 79 to 94, preferably 79 to 91; an L* value of 91 to 98, preferably 91 to 97; an a* value of −0.3 to 1.2, preferably −0.1 to 1.2; a b* value of 0.0 to 5.0, preferably 1.0 to 5.0; or a Standard Contrast Ratio of 0.90 to 0.92.

Both 1-step classification and 2-step (double) classification were used to prepare the HEFAP, depending on the feed material. In the 1-step classification process, the fine fraction collected in the cyclone was the HEFAP and coarse fraction collected in the separation was a by-product or waste. In a 2-step double classification, the fine fraction output from the first classification (in this case after the separation stage and the cyclone stage) was used as the feed material for a second classification, which was utilized to further remove some fines or coarse particles, depending on the desired Hegman of the final HEFAP and to output the respective coarse or fine fraction as the product, as explained below and as shown in FIG. 2.

Figure 2:
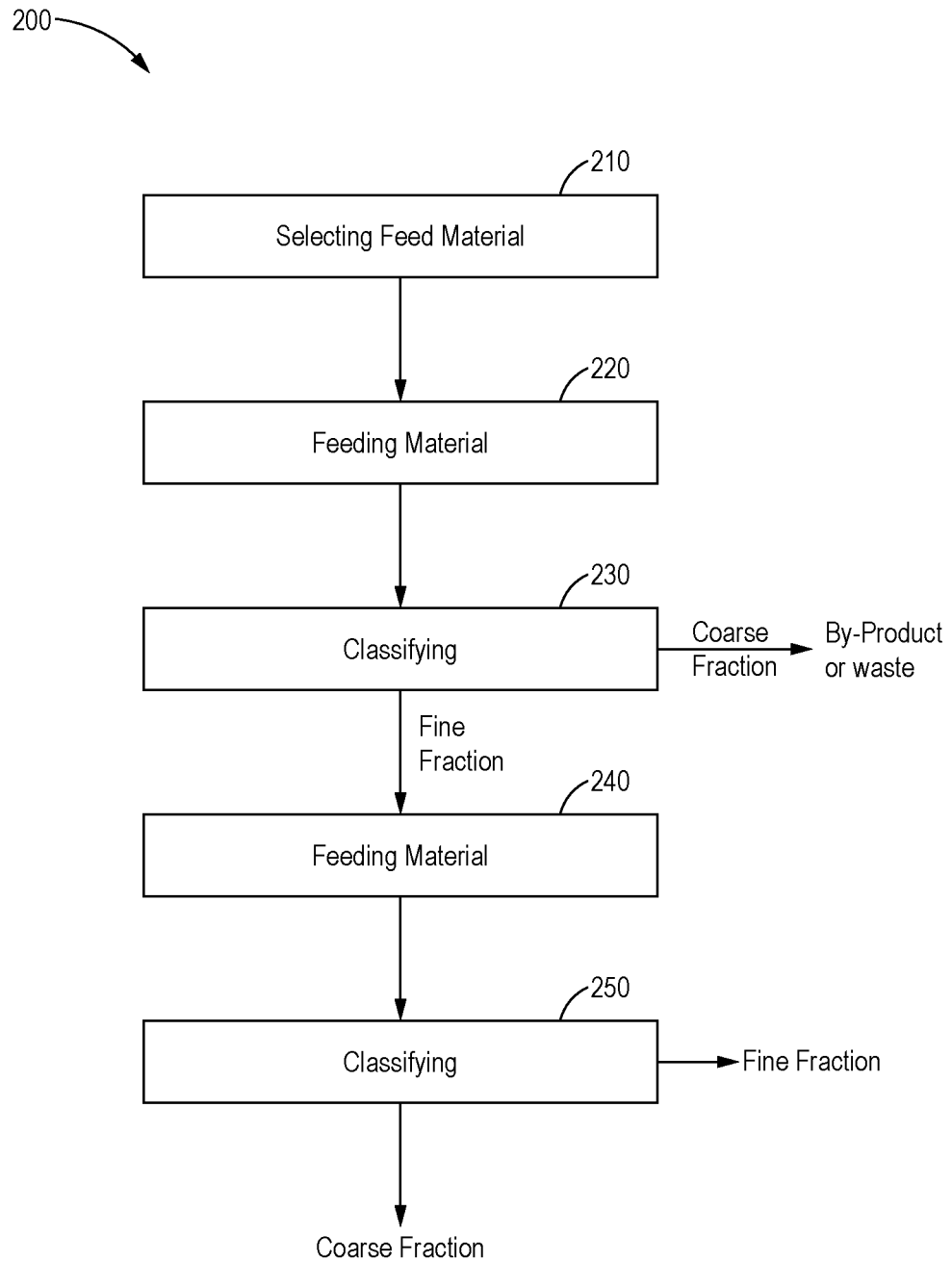
FIG. 2 illustrates another exemplary process flow diagram for making HEFAP.

FIG. 2 illustrates an exemplary process 200 that utilizes 2-step air classification to produce: (1) exemplary HEFAP having a Hegman of about 1.0 to about 2.0 (preferably, 1.0-2.0); or (2) HEFAP having a Hegman of about 2.5 to about 3.5 (preferably, 2.5-3.5); or (3) (as co-products) both a HEFAP having a Hegman of about 1.0 to about 2.0 (preferably, 1.0-2.0) and another HEFAP having a Hegman of about 2.5 to about 3.5 (preferably, 2.5-3.5).

To make HEFAP with a Hegman of about 1.0 to about 2.0 (preferably, 1.0-2.0) using the exemplary 2-step (double) classification process of FIG. 2, a D95 of 51-56 µm was targeted for the fine fraction output from the first classification so that the next classification of the collected fine fraction as feed yielded the desired product having a D95 of 59-67 µm. The second classification also removed the fines so that the Ratio R was minimized to be 0.35 to 0.52. For such a preparation procedure, a classification speed of about 4000 to about 4500 RPM (preferably, 4200-4300 RPM) and about 4000 to about 7000 RPM (preferably, 5000-6000 RPM) was determined to be appropriate for the first and second classification, respectively.

To make HEFAP with a Hegman of about 2.5 to about 3.5 (preferably, 2.5-3.5) using a 2-step (double) classification of FIG. 2, a D95 of 35-37 µm was targeted for the fine fraction collected in the first classification so that next classification with the collected fine fraction as feed will yield the desired D95 of 41-46 μm. Meanwhile, the second classification also removes the fines so that the Ratio R may be in the range of 0.34 to 0.45. For such a preparation procedure, a classification speed of about 4200 to about 5700 RPM (preferably 5500-5700 RPM) and about 5000 to about 7000 RPM (preferably, 6500-7000 RPM) was found appropriate for the first and second classification, respectively.

In some cases, a 2-step (double) classification may yield with both a HEFAP with a Hegman of about 1.0 to about 2.0 (preferably, 1.0-2.0) and another HEFAP with a Hegman of about 2.5 to about 3.5 (preferably, 2.5-3.5), with the coarse fraction collected in the second classification having a Hegman of about 1.0 to about 2.0 (preferably, 1.0-2.0) and the fine fraction having a Hegman of about 2.5 to about 3.5 (preferably, 2.5-3.5), respectively. In this case, a D95 of 51-56 μm was still targeted for the fine fraction collected in the first classification. A classification speed of about 4200 to about 4300 RPM and about 5000 to about 5500 RPM was found appropriate for the first and second classification, respectively.

The process 200 is described more specifically below. In block 210 (see also block 110, 310 and 410) feed material is selected. The feed material comprises diatomite. In preferred embodiments, the feed material may be diatomite. The diatomite may comprise flux calcined diatomite or may be flux calcined diatomite.

The feed material may have a Y value in the CIE Yxy color space in the range of, 80 to 100, preferably, in the range of 87-94. The feed material may have a b* value in the L*a*b* color space in the range of 0 to 5, preferably, 0 to 4. The feed material may have a D50 in the range of 15-70 μm, preferably, in the range of 25-40 μm. The feed material may have an L* value in the range of 89-100, preferably, in the range of 95-98. The feed material may have an a* value in the range of −0.7-1.6, preferably, in the range of −0.3-1.0. With regard to the feed material, the Ratio (R) of SD to D50 may be in the range of 0.3-1.3, preferably, in the range of 0.6-1.3.

The process 200 to make HEFAP tends to reduce the brightness and increase the tint of feed material, thus in a preferred embodiment, the feed material comprises a diatomaceous earth that has a high brightness (Y value of 87 to 94) and low tint (b* value of 0 to 4). Such brightness and tint values can be found in flux calcined diatomite. However, while the optical properties of a material may be within a desired range for a feed material, if the material does not contain enough particles within the desired PSD of the HEFAP to be produced, the material may be unacceptable for use as a feed material. For example, a feed material comprising a coarser flux calcined diatomite, such as FW40 (EP Minerals' product), may be too coarse to contain particles with the desired PSD range for Hegman 2.5 to 3.5. Product development by the inventors showed that the feed material should have a D50 of 15-70 μm, preferably, in the range of 25-40 μm.

In block 220, the feed material is fed into an air classifier via a volumetric feeder such as a Schenck process AccuRate 304, or the like. Preferably, the feeder rate setting of the volumetric feeder is 100 L/h to 200 L/h, which was measured to be (520 g/h to 1.4 kg/h for the feed material used in this disclosure), and the agitation rate is about 300 to about 400.

In block 230, the feed material may be classified by an air classifier, such as a Comex ACX-50 classifier or other similar classifier. The Comex ACX-50 classifier is equipped with high speed classifying system that includes a separator stage and a cyclone stage. Similar to the process of FIG. 1, the classifying air injected into the classifier base flows inwards through the classifier and discharges a fine fraction (of the material). In a classifier such as the Comex ACX-50 that utilizes a separator stage followed by a cyclone stage, the fine fraction output by the separator (of the classifier) flows into the cyclone; a resulting fine fraction (fine particles with: D95 of 51-56 μm or D95 of 35-37 μm) is output from the cyclone as a result of the first classifying of block 230. When making a HEFAP having a Hegman of 1.0-2.0, a D95 of 51-56 μm is targeted for the fine fraction collected in the first classification. When making a HEFAP having a Hegman of 2.5-3.5, a D95 of 35-37 μm is targeted for the fine fraction collected in the first classification. When making as co-products both a HEFAP having a Hegman of 1.0-2.0 and another HEFAP having a Hegman of 2.5-3.5, a D95 of 51-56 μm is targeted for the fine fraction collected in the first classification. The coarse fraction rejected by the classifier in the first classification leaves through a coarse material outlet and may be considered a by-product or a waste product of this process 200.

To generate a powdered HEFAP, which has (1) a Hegman of about 1.0 to about 2.0 (preferably, 1.0-2.0), and (2) a Standard Sheen value of 0.4 to 0.5, the classification speed of block 230 may be in the range of about 4000 to about 4500 RPM, preferably, 4200-4300 RPM, and the airflow may be in the range of 25 to 55 m$^3$/h, preferably 45 m$^3$/h. Preferably, the D95 of the fine fraction collected in the first classification of block 230 is in the range of 51-56 μm so that next classification of block 250 will yield the desired D95 of 59-67 μm for the coarse fraction and a Ratio (R) that is 0.35 to 0.52.

To generate a powdered HEFAP, which has (1) a Hegman that is about 2.5 to about 3.5 (preferably, 2.5-3.5) and (2) a Standard Sheen value of 0.6 to 0.7, the classification speed of the first classifying of block 230 may be in the range of about 4200 to about 5700 RPM (preferably 5500-5700 RPM), and the airflow may be in the range of 25 to 55 m$^3$/h, preferably 45 m$^3$/h. Preferably, the D95 of the fine fraction collected in the first classification of block 230 is in the range of 35-37 μm so that next classification of block 250 will yield the desired D95 of 41-46 μm for the fine fraction and a Ratio (R) that is 0.34 to 0.45.

To generate as co-products output from the second classifying of block 250 (1) a powdered HEFAP having a Hegman of about 1.0 to about 2.0 (preferably, 1.0-2.0) and a Standard Sheen value of 0.4 to 0.5, and (2) a powdered HEFAP having a Hegman of about 2.5 to about 3.5 (preferably, 2.5-3.5) and a Standard Sheen value of 0.6 to 0.7, the classification speed of the first classifying of block 230 may be in the range of about 4200 to about 4300 RPM.

In block 240, a volumetric feeder, such as a Schenckprocess AccuRate 304, or the like feeds the result of block 230 (the fine fraction) into the second classifying process. Preferably, the feeder rate setting of the volumetric feeder is 100 L/h to 200 L/h, which was measured to be (520 g/h to 1.4 kg/h for the feed material used in this disclosure), and the agitation rate is about 300 to about 400.

In block 250, the fine fraction is classified by a classifier, such as a Comex ACX-50 classifier or other similar classifier. Similar to above, the classifying air injected into the Comex ACX-50 machine base flows inwards through the classifier and outputs a fine fraction (of the material) and a coarse fraction. In a classifier such as the Comex ACX-50 that utilizes a separator stage followed by a cyclone stage, the fine fraction output by the separator (of the classifier)

flows into the cyclone and a resulting fine fraction is output from the cyclone as a result of the second classifying of block 250. The coarse particles rejected by the classifier leave through a coarse material outlet.

To make a HEFAP with a Hegman of about 1.0 to about 2.0 (preferably, 1.0-2.0) using the 2-step double classification process 200 of FIG. 2, the classification speed of the second classifying in block 250 may be in the range of about 4000 to about 7000 RPM (preferably, 5000 RPM to 6000 RPM), and the airflow may be in the range of 25 to 55 m³/h, preferably 45 m³/h. The coarse fraction output from the separator stage is the HEFAP with the Hegman of about 1.0 to about 2.0 (preferably, 1.0-2.0). The classification of block 250 yields D95 of 59-67 µm for the coarse fraction with a Hegman of 1.0-2.0. In an embodiment, the HEFAP may further have one or more of the following: a Ratio (R) of 0.30 to 0.52, preferably 0.35 to 0.52; a Y value of 79 to 94, preferably 79 to 91; an L* value of 91 to 98, preferably 91 to 97; an a* value of −0.3 to 1.2, preferably −0.1 to 1.2; a b* value of 0.0 to 5.0, preferably 1.0 to 5.0; or a Standard Contrast Ratio in the range of 0.90 to 0.92.

Whereas to make to make a HEFAP with a Hegman of about 2.5 to about 3.5 (preferably, 2.5-3.5) using the 2-step double classification process 200 of FIG. 2, the classification speed of the second classifying in block 250 may be in the range of about 5000 to about 7000 RPM (preferably, 6500-7000 RPM), and the airflow may be in the range of 25 to 55 m³/h, preferably 45 m³/h. The fine fraction output from the cyclone stage is the HEFAP with a Hegman of about 2.5 to about 3.5 (preferably, 2.5-3.5). The classification of block 250 yields a D95 of 41-46 µm for the fine fraction (that has a Hegman of 2.5-3.5). In an embodiment, the HEFAP may further have one or more of the following: a Ratio (R) of 0.30 to 0.45, preferably 0.34 to 0.45; a Y value of 79 to 94, preferably 79 to 91; an L* value of 91 to 98, preferably 91 to 97; an a* value of −0.3 to 1.2, preferably −0.1 to 1.2; a b* value of 0.0 to 5.0, preferably 1.0 to 5.0; or a Standard Contrast Ratio of 0.90 to 0.92.

When generating as co-products output from the second classifying of block 250 (1) a powdered HEFAP having a Hegman of about 1.0 to about 2.0 (preferably, 1.0-2.0) and a Standard Sheen value of 0.4 to 0.5, and (2) a powdered HEFAP having a Hegman of about 2.5 to about 3.5 (preferably, 2.5-3.5) and a Standard Sheen value of 0.6 to 0.7, the classification speed of the second classifying of block 250 may be in the range of about 5000 to about 5500 RPM. The classification of block 250 yields D95 of 59-67 µm for the coarse fraction with a Hegman of 1.0 to 2.0; such coarse fraction HEFAP may further have one or more of the following: a Ratio (R) of 0.30 to 0.52, preferably 0.35 to 0.52; a Y value of 79 to 94, preferably 79 to 91; an L* value of 91 to 98, preferably 91 to 97; an a* value of −0.3 to 1.2, preferably −0.1 to 1.2; a b* value of 0.0 to 5.0, preferably 1.0 to 5.0; or a Standard Contrast Ratio in the range of 0.90 to 0.92. The classification of block 250 yields a D95 of 41-46 µm for the fine fraction with a Hegman of 2.5 to 3.5; such fine fraction HEFAP may further have one or more of the following: a Ratio (R) of 0.30 to 0.45, preferably 0.34 to 0.45; a Y value of 79 to 94, preferably 79 to 91; an L* value of 91 to 98, preferably 91 to 97; an a* value of −0.3 to 1.2, preferably −0.1 to 1.2; a b* value of 0.0 to 5.0, preferably 1.0 to 5.0; or a Standard Contrast Ratio of 0.90 to 0.92.

Another method of preparing the HEFAP is by careful sieving of the feed materials. For example, a centrifugal sifter (such as various KEK models from Kemutec Inc, Bristol, Pa.) may be used to remove the coarse particles in the feed materials and collect the fine fraction as the product.

Figure 3:
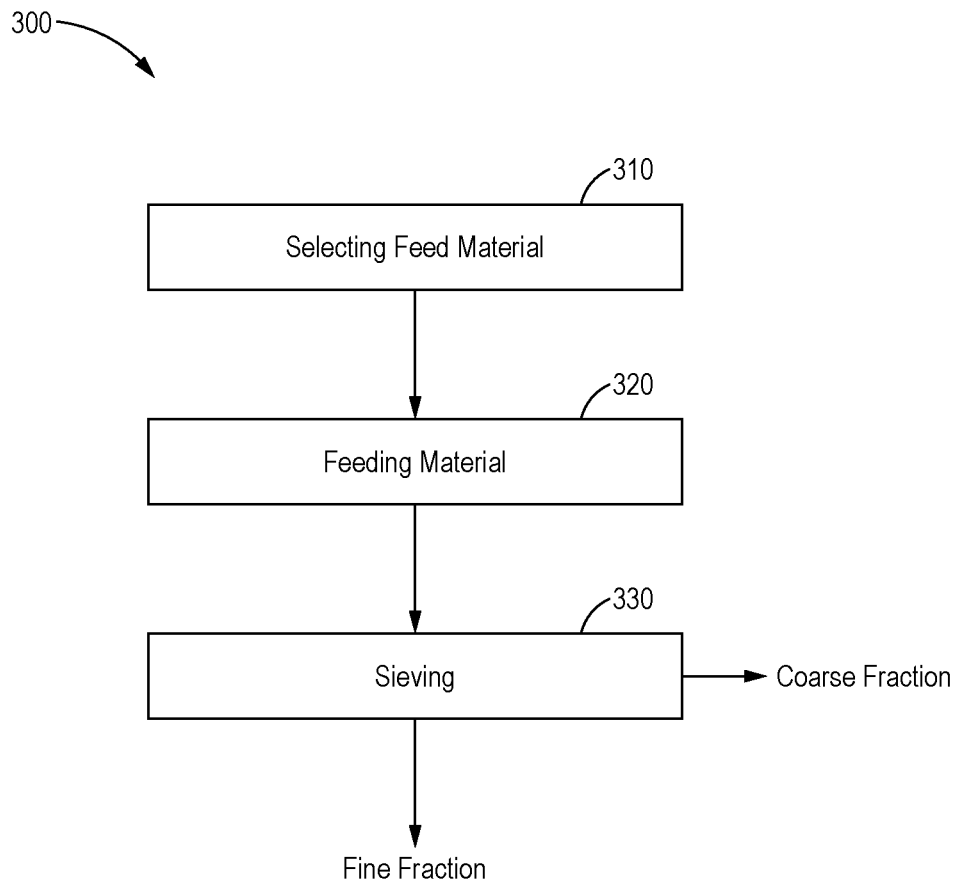
FIG. 3 illustrates another exemplary process flow diagram for making HEFAP.

FIG. 3 illustrates an exemplary process 300 that utilizes sieving to prepare HEFAP products having a Hegman of about 1.0 to about 2.0 (preferably, 1.0-2.0), or about 2.5 to about 3.5 (preferably, 2.5-3.5). In block 310 (see also block 110, 210 and 410) feed material is selected. The feed material comprises diatomite. In preferred embodiments, the feed material may be diatomite. The diatomite may comprise or may be flux calcined diatomite.

The feed material may have a Y value in the CIE Yxy color space in the range of, 80 to 100, preferably, in the range of 87-94. The feed material may have a b* value in the L*a*b* color space in the range of 0 to 5, preferably, 0 to 4. The feed material may have a D50 in the range of 15-70 µm, preferably, in the range of 25-40 µm. The feed material may have an L* value in the range of 89-100, preferably, in the range of 95-98. The feed material may have an a* value in the range of −0.7-1.6, preferably, in the range of −0.3-1.0. With regard to the feed material, the Ratio (R) of SD to D50 may be in the range of 0.3-1.3, preferably, in the range of 0.6-1.3.

The process 300 to make HEFAP tends to reduce the brightness and increase the tint of feed material, thus in a preferred embodiment, the feed material comprises a diatomaceous earth that has a high brightness (Y value of 87 to 94) and low tint (b* value of 0 to 4). Such brightness and tint values can be found in flux calcined diatomite. However, while the optical properties of a material may be within a desired range for a feed material, if the material does not contain enough particles within the desired PSD of the HEFAP to be produced, the material may be unacceptable for use as a feed material. For example, a feed material comprising a coarser flux calcined diatomite, such as FW40 (EP Minerals product), may be too coarse to contain particles with the desired PSD range with Hegman of 2.5-3.5. Extensive trials done by the inventors showed that the feed material should have a D50 of 15-70 µm, preferably, in the range of 25-40 µm.

In block 320, the feed material is fed into a sifter via a volumetric feeder such as a Schenckprocess AccuRate 304, or the like. Preferably, the feeder rate setting of the volumetric feeder is 100 L/h to 200 L/h, which was measured to be (520 g/h to 1.4 kg/h for the feed material used in this disclosure), and the agitation rate is about 300 to about 400.

In block 330, the feed material may be sieved by a centrifugal sifter, such as a Kemutec® KEK laboratory centrifugal sifter. The mesh size for making HEFAP having a Hegman of about 1.0 to about 2.0 (preferably, 1.0-2.0) or HEFAP having a Hegman of about 2.5 to about 3.5 (preferably, 2.5-3.5) was 270 mesh (53 µm) or 400 mesh (37 µm), respectively. The HEFAP product is the resulting fine fraction.

To make a powdered HEFAP product with a Hegman of about 1.0 to about 2.0 (preferably, 1.0-2.0), that has a Standard Sheen value of 0.4 to 0.5, the mesh size is 270 mesh (53 µm). The sieving of block 330 yields D95 of 59 to 67 µm for the fine fraction with a Hegman of 1.0-2.0. In an embodiment, the HEFAP may further have one or more of the following: a Ratio (R) of 0.30 to 0.52, preferably 0.35 to 0.52; a Y value of 79 to 94, preferably 79 to 91; an L* value of 91 to 98, preferably 91 to 97; an a* value of −0.3 to 1.2, preferably −0.1 to 1.2; a b* value of 0.0 to 5.0, preferably 1.0 to 5.0; or a Standard Contrast Ratio of 0.90 to 0.92.

To generate a powdered HEFAP product with a Hegman that is about 2.5 to about 3.5 (preferably, 2.5-3.5), that has a Standard Sheen value of 0.4 to 0.5, the mesh size is 400 mesh (37 µm). The sieving of block 330 yields a D95 of 41 to 46 µm for the fine fraction (that has a Hegman of 2.5-3.5).

In an embodiment, the HEFAP may further have one or more of the following: a Ratio (R) of 0.30 to 0.45, preferably 0.34 to 0.45; a Y value of 79 to 94, preferably 79 to 91; an L* value of 91 to 98, preferably 91 to 97; an a* value of −0.3 to 1.2, preferably −0.1 to 1.2; a b* value of 0.0 to 5.0, preferably 1.0 to 5.0; or a Standard Contrast Ratio of 0.90 to 0.92.

Alternatively, a combination of air classification and sieving can be used to prepare the HEFAP. In the first step, sieving may be used to remove the coarse particles and the fine fraction may be collected as feed for subsequent classification. For example, to make HEFAP with about 1.0 to about 2.0 Hegman (preferably, 1.0-2.0) with such process, the first step may be a sieving through a Kemetuc KEK laboratory centrifugal sifter equipped with a 325 mesh (44 μm) screen to produce fine fractions with a D95 targeting 50-55 μm. The collected fine fraction after sifting can then be used as the feed for air classification, for example, using a Comex ACX-50 classifier operated at about 6000 RPM classification speed.

Figure 4:
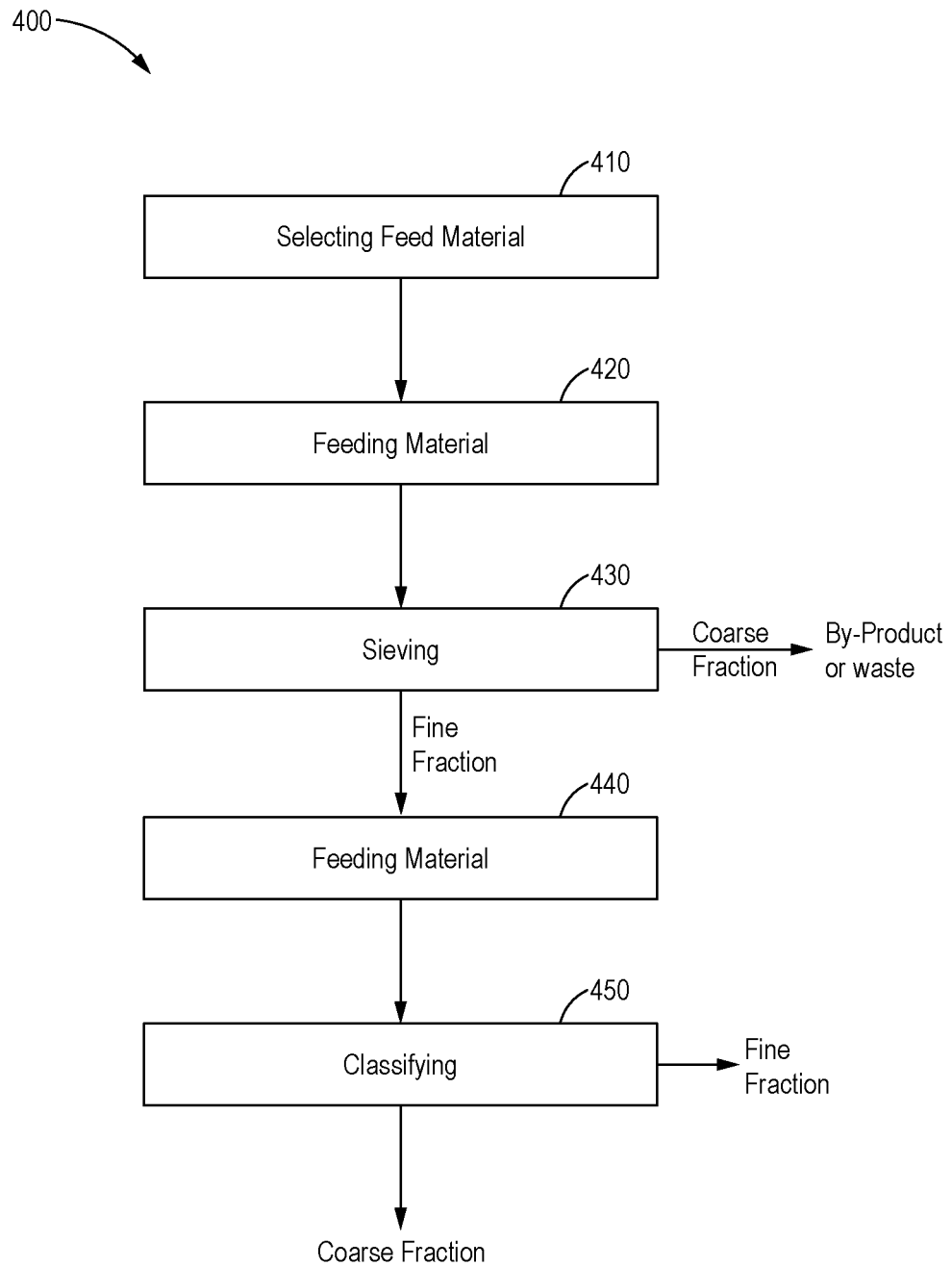
FIG. 4 illustrates another exemplary process flow diagram for making HEFAP.

FIG. 4 illustrates an exemplary process 400 that utilizes a combination of sieving and air classification to prepare HEFAP having a Hegman of about 1.0 to about 2.0 (preferably, 1.0-2.0). In block 410 (see also block 110, 210 and 310) the feed material is selected. The feed material comprises diatomite. In preferred embodiments, the feed material may be diatomite. The diatomite may comprise flux calcined diatomite or may be flux calcined diatomite.

The feed material may have a Y value in the CIE Yxy color space in the range of, 80 to 100, preferably, in the range of 87 to 94. The feed material may have a b* value in the L*a*b* color space in the range of 0 to 5, preferably, 0 to 4. The feed material may have a D50 in the range of 15-70 μm, preferably, in the range of 25-40 μm. The feed material may have an L* value in the range of 89-100, preferably, in the range of 95-98. The feed material may have an a* value in the range of −0.7 to 1.6, preferably, in the range of −0.3 to 1.0. With regard to the feed material, the Ratio (R) of SD to D50 may be in the range of 0.3-1.3, preferably, in the range of 0.6-1.3.

The process 400 to make HEFAP tends to reduce the brightness and increase the tint of feed materials, thus in a preferred embodiment, the feed material comprises a diatomaceous earth that has a high brightness (Y value of 87 to 94) and low tint (b* value of 0 to 4). Such brightness and tint values can be found in flux calcined diatomite. However, while the optical properties of a material may be within a desired range for a feed material, if the material does not contain enough particles within the desired PSD of the HEFAP to be produced, the material may be unacceptable for use as a feed material. Extensive trials done by the inventors showed that the feed material should have a D50 of 15-70 μm, preferably, in the range of 25-40 μm.

In block 420, the feed material is fed into a sifter via a volumetric feeder such as a Schenckprocess AccuRate 304, or the like. Preferably, the feeder rate of the volumetric feeder is about 100 L/h to about 200 L/h, which was measured to be (520 g/h to 1.4 kg/h for the feed material used in this disclosure) and the agitation rate is about 300 to about 400.

In block 430, the feed material is sieved by a centrifugal sifter, such as a Kemutec KEK laboratory centrifugal sifter was used. The mesh size for making HEFAP with a Hegman of about 1.0 to about 2.0 (preferably, 1.0-2.0) was 325 mesh (44 μm) screen to produce fine fractions with a D95 of 50-55 μm. The resulting fine fraction output from the sieving is then feed into a classifier for further processing.

In block 440, a volumetric feeder, such as a Schenckprocess AccuRate 304, or the like feeds the result of block 430 (the fine fraction) into the classifier. Preferably, the feeder rate of the volumetric feeder is about 100 L/h to about 200 L/h, which was measured to be (520 g/h to 1.4 kg/h for the feed material used in this disclosure), and the agitation rate is about 300 to about 400.

In block 450, the fine fraction is classified by the classifier, such as a Comex ACX-50 classifier or other similar classifier. Similar to above, the classifying air injected into the Comex ACX-50 machine base flows inwards through the classifier and outputs a fine fraction (of the material) and a coarse fraction. In a classifier such as the Comex ACX-50 that utilizes a separator stage followed by a cyclone stage, the fine fraction output by the separator (of the classifier) flows into the cyclone and a resulting fine fraction is output from the cyclone as a result of the classifying of block 450. The coarse particles rejected by the classifier leave through a coarse material outlet.

To make a final product HEFAP with a Hegman of about 1.0 to about 2.0 (preferably, 1.0-2.0) using the sieving and air classification process 400 of FIG. 4, the classification speed of the classifying in block 450 is in the range of about 4000 to about 7000 RPM, preferably, 5000-6000 RPM, and the airflow is in the range of 25 to 55 $m^3$/h, preferably 45 $m^3$/h. The coarse fraction output from the separator is the HEFAP that has a Hegman of about 1.0 to about 2.0 (preferably, 1.0-2.0) and the fine fraction is the by-product or waste product of this process 400. The classification of block 450 will yield a D95 of 59-67 μm for the coarse fraction. In an embodiment, the HEFAP may further have one or more of the following: a Ratio (R) of 0.30 to 0.52, preferably 0.35 to 0.52; a Y value of 79 to 94, preferably 79 to 91; an L* value of 91 to 98, preferably 91 to 97; an a* value of −0.3 to 1.2, preferably −0.1 to 1.2; a b* value of 0.0 to 5.0, preferably 1.0 to 5.0; or a Standard Contrast Ratio of 0.90 to 0.92.

Classification and sieving are techniques that are used by the industry in producing DE functional additives. For example, the kiln discharge of the flux calcined material may be subjected to mechanical or air classification to remove 10-30 wt % of the finer fraction as DE filler product and the coarser fraction may be collected in a cyclone as a fast flow rate filter aids with significantly enhanced permeability. However, unlike the teachings of the prior art, the processing herein controls PSD by maximizing the D95 and minimizing the Ratio R to make HEFAP. A comparison of the PSD between HEFAP and the prior art highlights the difference. For example, while some Celite 281 products (see Table 1, Samples #20022, 38816, 9103, 37072, and 39569) share the similar D95 range (i.e. 59-68 μm) with the HEFAP having 1.0-2.0 Hegman (see Table 9), they have a large Ratio R of 0.72-0.84, as compared to 0.35-0.52 of HEFAP, which negatively effects their effectiveness in flatting. Similar comparison can also be made between the Celite 499 from Lompoc, CA (Table 1, Sample #20023) and the HEFAP with 2.5-3.5 Hegman (Table 10).

On the other hand, a product with a low Ratio R but not a maximized D95 would also not show a high effectiveness in flatting. For example, some Celite 281 (Table 1, Samples #32083, and 27626) and Celite 499 (Table 1, Sample #22222) within the Hegman range of 2.5-3.5 have a Ratio R of 0.44-0.47, while the HEFAP with 2.5-3.5 Hegman show a Ratio R of 0.34 to 0.45. However, their D95 values are much smaller than that of HEFAP (26-36 μm versus 41-46 μm).

Preparation of HEFAP that Comprise Diatomite and that have Non-Detectable Crystalline Silica Content (Are Free of Detectable Crystalline Silica Content)

As discussed previously, the feed material comprises diatomite. In preferred embodiments, the feed material may be diatomite. The diatomite may comprise flux calcined diatomite or may be flux calcined diatomite. The feed material may have a Y value in the CIE Yxy color space in the range of, 80 to 100, preferably, in the range of 87-94. The feed material may have a b* value in the L*a*b* color space in the range of 0 to 5, preferably, 0 to 4. The feed material may have a D50 in the range of 15-70 μm, preferably, in the range of 25-40 μm. The feed material e may have an L* value in the range of 89-100, preferably, in the range of 95-98. The feed material may have an a* value in the range of −0.7 to 1.6, preferably, in the range of −0.3 to 1.0. With regard to the feed material, the Ratio (R) of SD to D50 may be in the range of 0.3-1.3, preferably, in the range of 0.6-1.3.

The desired bright optical properties may be achieved with preparation of a feed material (for blocks 110, 210, 310 and 410) that comprises a flux calcined diatomite. In an embodiment, the feed material may have crystalline silica content; in such an embodiment, the resulting HEFAP will also have crystalline silica content. In an alternative embodiment, the feed material may be free of detectable crystalline silica content (sometimes described as having non-detectable crystalline silica content) and the same classification and/or sieving processes as described above with regard to FIGS. 1-4 may be used to prepare such HEFAP that is free of detectable crystalline silica (as measured according to the LH Method) and that has the desired bright optical properties. To do this, the feed materials utilized in blocks 110, 210, 310 and 410 ("Selecting Feed Material") of the classification and/or sieving processes of FIGS. 1-4 are prepared so that they contain no detectable crystalline silica content (or are free of all detectable crystalline silica), as measured using the LH Method described herein.

Unpublished PCT patent application Lenz, et al. (PCT/US18/014514) teaches suitable feed materials that are free of detectable crystalline silica (in other words, they have a crystalline silica content of zero wt. %) and may be selected as feed material (see blocks 110, 210, 310, 410 of the processes of FIGS. 1-4). Such materials taught in Lenz, et al. may comprise flux calcined diatomite (or may be flux calcined diatomite) and may also have properties such as a Y value of 84 to 93, L* from 93 to 97, a* from −0.5 to 1.6, b* from 2.4 to 4.8, D50 from 25-40 μm, and an Opal-C content from 22 to 28.

In some embodiments, although not all embodiments, the feed material utilized in blocks 110, 210, 310, and 410 may comprise diatomite (or may be diatomite) that may: (1) have been prepared from diatomite ore that has silica content in the range of about 79.0 wt. % to about 89.0 wt. % $SiO_2$, alumina ($Al_2O_3$) in the range of about 0.5 wt. % to about 4.4 wt. % and iron oxide ($Fe_2O_3$) in the range of about 0.1 wt. % to about 2.5 wt. %; and (2) contain no detectable crystalline silica content (or is free of all crystalline silica content), as determined by the LH Method.

To prepare flux calcined diatomite, the diatomite ore is prepared for calcination by first crushing the ore to reduce the size of the run-of-mine material. The crushed ore is subjected to simultaneous milling and flash drying to effect de-agglomeration of the lumpy particles to generate fluidized powder. To ensure that the calcined product maintains its bright optical properties, the flash dried material is subjected to heavy minerals and impurities separation that effects purification. Such a process is carried out with the aid of a mechanical separator, an air separator or a centrifugal sifter. The purified diatomite ore feed is prepared for flux calcination by thoroughly blending the purified diatomite with one or more finely milled fluxing agents by means of fluidization to achieve optimal mixing. The one or more fluxing agent(s) may include an alkali oxide fluxing agent, soda ash, potash, borax, lithium oxide or mixtures thereof.

The blended feed may be subjected to thermal treatment in a rotary kiln to effect the calcination. The flux calcination process may be carried out in a directly-fired kiln in which the diatomaceous earth product makes direct contact with the flame from the kiln burner and the heated kiln refractory. Alternatively, an indirectly-fired kiln, in which the shell of the kiln is heated from the outside and the diatomaceous earth does not make any direct contact with the burner flame and calcination is achieved through heat conduction from the kiln refractory, may be employed.

To prepare a feed material that is free of detectable crystalline silica content, the flux calcination process conditions may be selected such that the resulting flux calcined diatomaceous earth has Opal-C content (opal-C and/or opal-CT) and further has the desired optical properties of a Y value in the range of, 80 to 100, preferably, in the range of 87-94, and a b* value in the range of 0 to 5, preferably, 0 to 4. The diatomite has a D50 in the range of 15-70 μm, preferably, in the range of 25-40 μm. The diatomite may have an L* value in the range of 89-100, preferably, in the range of 95-98. The diatomite may have an a* value in the range of −0.7 to 1.6, preferably, in the range of −0.3 to 1.0. The SD may be in the range of 0.3-1.3, preferably, in the range of 0.6-1.3. Calcination of the feed material that is free of detectable crystalline silica content is carried out in a temperature range of 815° C. to 1204° C. (1500° F. to 2200° F.) for a period ranging from 15 minutes to 60 minutes. The appropriate temperature for the calcination operation is mostly determined by the source of the diatomaceous earth ore but will typically range from 870° C. to 1200° C., depending on the ore composition such as, the organic content.

The total amount of fluxing agent(s) used for generating products with the desired optical properties ranges from about 3 wt. % to about 8 wt. %, depending on the bulk chemistry of the purified feed ore. The stoichiometric ratio of the aggregate of the one or more fluxing agents (for example, soda ash), to the alumina and iron oxide content in the feed ranges from 100% to 400%. Generally, flux calcined products containing Opal-C are generated when the stoichiometric ratio is in the range of 100% to 200%.

After flux calcination, the kiln discharge is typically subjected to mechanical or air classification to remove 10-30 wt. % or more of the finer fraction (typically as filler product) and the coarser fraction is collected in a cyclone (often to be utilized as a fast flow rate filter aid with significantly enhanced permeability). The collected coarser fraction, also called "main bin" fraction, may be used in the feed material (see blocks 110, 210, 310 and 410) for the classification and/or sieving processes of FIGS. 1-4. Such main bin fraction may be used in the feed material to make HEFAP that is free of all detectable crystalline silica (if the main bin fraction is free of all detectable crystalline silica content), or may be used in the feed material to make HEFAP that has a crystalline silica content (if the main bin fraction has a crystalline silica content).

EXAMPLES

HEFAP Examples Comprising Diatomite and Having a Hegman Fineness from about 1.0 to about 2.0

Table 9 shows HEFAP examples comprising diatomite and having a Hegman fineness from 1.0 to about 2.0.

Samples #38800 and #38799

Samples #38800 and #38799 were prepared by a 2-step double air classification according to the process 200 of FIG. 2. FW14 filter aid material from EP Minerals was used as the feed material into the first classifier. This feed material comprised flux calcined diatomaceous earth having (1) the following optical properties: a Y value of 93.36, an L* value of 97.37, an a* value of –0.27 and a b* value of 2.93; and (2) the following particle size distribution: D10=12.57, D50=31.67, D90=94.93 and D95=136.5. The first and second classification used a COMEX ACX-50 classifier.

For Sample #38800, the feed material was fed into the first air classification via a Schenckprocess AccuRate 304 volumetric feeder. The feeder rate setting was 200 L/h, which was measured to be about 1.4 kg/h and the agitation rate was 400.

A Comex ACX-50 classifier was used for the first air classification. The Comex ACX-50 classifier was equipped with high speed classifying system that included a separator stage and a cyclone stage. The classification speed for the first air classification was 4300 RPM and the airflow was 45 $m^3/h$. The fine fraction collected in the first classification (block 230) had the following PDS: D10: 10.98 µm; D50: 23.26 µm; D90: 45.13 µm; and D95: 55.57 µm.

The fine fraction from the first air classification was fed into the second air classification via a Schenckprocess AccuRate 304 volumetric feeder. The feeder rate setting was 200 L/h, which was measured to be about 1.4 kg/h and the agitation rate was 400.

A Comex ACX-50 classifier was used for the second air classification. The Comex ACX-50 classifier was equipped with high speed classifying system that included a separator stage and a cyclone stage. The classification speed for the second air classification was 6000 RPM and the airflow was 45 $m^3/h$. The HEFAP was the coarse fraction resulting from the second air classification (block 250) had (1) the following optical properties: a Y value of 84.17, an L* value of 93.53, an a* value of 0.29 and a b* value of 1.15; and (2) the following PDS: D10: 21.04 µm; D50: 33.45 µm; D90: 53.17 µm; and D95: 62.55 µm.

For Sample #38799, the feed material was fed into the first air classification via a Schenckprocess AccuRate 304 volumetric feeder. The feeder rate setting was 200 L/h, which was measured to be about 1.4 kg/h and the agitation rate was 400.

A Comex ACX-50 classifier was used for the first air classification. The Comex ACX-50 classifier was equipped with high speed classifying system that included a separator stage and a cyclone stage. The classification speed for the first air classification was 4300 RPM and the airflow was 45 $m^3/h$. The fine fraction collected in the first classification (block 230) had the following PDS: D10: 10.98 µm; D50: 23.26 µm; D90: 45.13 µm; and D95: 55.57 µm The fine fraction from the first air classification was fed into the second air classification via a Schenckprocess AccuRate 304 volumetric feeder. The feeder rate was 200 L/h and the agitation rate was 400.

A Comex ACX-50 classifier was used for the second air classification. The Comex ACX-50 classifier was equipped with high speed classifying system that included a separator stage and a cyclone stage. The classification speed for the second air classification was 5500 RPM and the airflow was 45 $m^3/h$. The HEFAP was the coarse fraction resulting from the second air classification (block 250) had (1) the following optical properties: a Y value of 84.10, an L* value of 93.50, an a* value of 0.10 and a b* value of 1.40; and (2) the following PDS: D10: 21.41 µm; D50: 34.85 µm; D90: 56.08 µm; and D95: 66.65 µm.

Sample #38992

Sample #38992 was also prepared by a 2-step double air classification according to the process 200 of FIG. 2 but with diatomite feed material free of detectable crystalline silica (see Table 14 for the chemistry properties of the feed material). This feed material comprised flux calcined diatomaceous earth having (1) the following optical properties: a Y value of 89.74, an L* value of 95.89, an a* value of 0.21 and a b* value of 3.41; and (2) the following particle size distribution: D10=15.02, D50=36.02, D90=71.29 and D95=125.5.

TABLE 14

Chemistry Properties of the Main Bin Feed Materials Used for Preparing the HEFAP Comprising Diatomite and Having Non-Detectable Crystalline Silica Content (free of crystalline silica content) including Samples #38992, 39149, 39146, 38993, 39148, and 39147

| | | |
|---|---|---|
| Opal-C (wt %)[1] | | 27.0 |
| Quartz (wt %)[3] | | N.D.[2] |
| Cristobalite (wt %)[3] | | N.D.[2] |
| Total Crystalline Silica (wt %)[3] | | N.D.[2] |
| Bulk Chemistry (XRF expressed as oxides) | $SiO_2$ (wt %) | 90.17 |
| | $Al_2O_3$ (wt %) | 2.79 |
| | CaO (wt %) | 0.74 |
| | MgO (wt %) | 0.32 |
| | $Na_2O$ (wt %) | 3.90 |
| | K2O (wt %) | 0.18 |
| | $Fe_2O_3$ (wt %) | 1.68 |

[1]Opal-C quantification is based on XRD Method as described in the LH Method of Lenz et al.
[2]Not-detected (N.D.)
[3]As determined under the LH Method.

For Sample #38992, the feed material was fed into the first air classification via a Schenckprocess AccuRate 304 volumetric feeder. The feeder rate setting was 200 L/h, which was measured to be about 1.4 kg/h and the agitation rate was 400.

A Comex ACX-50 classifier was used for the first air classification. The Comex ACX-50 classifier was equipped with high speed classifying system that included a separator stage and a cyclone stage. The classification speed for the first air classification was 4200 RPM and the airflow was 45 m$^3$/h. The fine fraction collected in the first classification (block 230) had the following PDS: D10: 12.30 μm; D50: 23.58 μm; D90: 42.31 μm; and D95: 51.18 μm.

The fine fraction from the first air classification was fed into the second air classification via a Schenckprocess AccuRate 304 volumetric feeder. The feeder rate setting was 200 L/h, which was measured to be about 1.4 kg/h and the agitation rate was 400.

A Comex ACX-50 classifier was used for the second air classification. The Comex ACX-50 classifier was equipped with high speed classifying system that included a separator stage and a cyclone stage. The classification speed for the second air classification was 5000 RPM and the airflow was 45 m$^3$/h. This process yielded co-products. The coarse fraction resulting from the second air classification (block 250) was a (first) HEFAP that had (1) the following optical properties: a Y value of 84.81, an L* value of 93.80, an a* value of −0.07 and a b* value of 2.04; and (2) the following PDS: D10: 20.60 μm; D50: 32.04 μm; D90: 50.49 μm; and D95: 59.33 μm. The fine fraction resulting from the second air classification (block 250) provided a (second) HEFAP (Sample #38993) discussed later herein.

Samples #39149, and #39146

The same feed material was used to prepare samples #39149, and #39146; but with #39149 prepared from 1-step air classification according to the process 100 of FIG. 1, and #39146 from sieving using a Kemutec KEK laboratory centrifugal sifter according to the process 300 of FIG. 3. This feed material comprised flux calcined diatomaceous earth having (1) the following optical properties: a Y value of 89.74, an L* value of 95.89, an a* value of 0.21 and a b* value of 3.41; and (2) the following particle size distribution: D10=15.02, D50=36.02, D90=71.29 and D95=125.5. This diatomaceous earth was main bin material that was free of detectable crystalline silica (see Table 14 for the chemistry properties of the feed material).

For Sample #39149, the feed material was fed into the air classifier via a Schenckprocess AccuRate 304 volumetric feeder. The feeder rate setting was 200 L/h, which was measured to be about 1.4 kg/h and the agitation rate was 400.

A Comex ACX-50 classifier was used for the air classification. The Comex ACX-50 classifier was equipped with high speed classifying system that included a separator stage and a cyclone stage. The classification speed for the air classification was 3500 RPM and the airflow was 45 m$^3$/h.

The HEFAP was the fine fraction resulting from the air classification (block 130) and had (1) the following optical properties: a Y value of 86.85, an L* value of 94.68, an a* value of −0.05 and a b* value of 2.37; and (2) the following PDS: D10: 13.64 μm; D50: 28.75 μm; D90: 53.87 μm; and D95: 65.80 μm.

For Sample #39146, the feed material was fed into the centrifugal sifter via a Schenckprocess AccuRate 304 volumetric feeder. The feeder rate setting was 100 L/h, which was measured to be about 520 g/h and the agitation rate was 300.

The feed material is sieved by a centrifugal sifter, (Kemutec KEK laboratory centrifugal sifter) set for a mesh size of 270 mesh. The resulting fine fraction was the HEFAP which had (1) the following optical properties: a Y value of 88.54, an L* value of 95.39, an a* value of 0.03 and a b* value of 2.66; and (2) the following PDS: D10: 14.02 μm; D50: 30.36 μm; D90: 55.16 μm; and D95: 66.79

Sample #38462

A similar feed material containing non-detectable crystalline silica content (free of crystalline silica content) was used to prepare Sample #38462 (see Table 15 for the chemistry properties of the feed materials). However, a combination of sieving and air classification (according to process 400 illustrated in FIG. 4) was used to prepare this sample. This feed material comprised flux calcined diatomaceous earth having (1) the following optical properties: a Y value of 87.99, an L* value of 95.16, an a* value of 0.83 and a b* value of 3.88; and (2) the following particle size distribution: D10=11.87, D50=27.60, D90=70.85 and D95=97.23. This diatomaceous earth was main bin material that was free of detectable crystalline silica (see Table 15 for the chemistry properties of the feed material).

TABLE 15

Chemistry properties of the Main Bin Feed Materials Used for Preparing the HEFAP Comprising Diatomite and Having Non-Detectable Crystalline Silica including Samples #38462, and 38802

| | | |
|---|---|---|
| Opal-C (wt %)[1] | | 25.1 |
| Quartz (wt %)[3] | | N.D.[2] |
| Cristobalite (wt %)[3] | | N.D.[2] |
| Total Crystalline Silica (wt %)$_3$ | | N.D.[2] |
| Bulk Chemistry | SiO$_2$ (wt %) | 92.04 |
| (XRF expressed as | Al$_2$O$_3$ (wt %) | 2.56 |
| oxides) | CaO (wt %) | 0.72 |
| | MgO (wt %) | 0.33 |
| | Na$_2$O (wt %) | 2.29 |
| | K$_2$O (wt %) | 0.21 |
| | Fe$_2$O$_3$ (wt %) | 1.58 |

[1]Opal-C quantification is based on XRD Method as described in the LH Method of Lenz et al.
[2]Not-detected (N.D.);
[3]As determined under the LH Method.

For Sample #38462, the feed material was fed into the centrifugal sifter via a Schenckprocess AccuRate 304 volumetric feeder. The feeder rate setting was 100 L/h, which was measured to be about 520 g/h and the agitation rate was 300.

The feed material was sieved by a centrifugal sifter, (Kemutec KEK laboratory centrifugal sifter) set for a mesh size of 325 mesh. The resulting fine fraction had the following PDS: D10: 10.88 μm; D50: 23.20 μm; D90: 44.24 μm; and D95: 54.19 μm.

The fine fraction was then fed into an air classifier via a Schenckprocess AccuRate 304 volumetric feeder. The feeder rate setting was 200 L/h, which was measured to be about 1.4 kg/h and the agitation rate was 400.

A Comex ACX-50 classifier was used for the air classification. The Comex ACX-50 classifier was equipped with high speed classifying system that included a separator stage and a cyclone stage. The classification speed for the air classification was 6000 RPM and the airflow was 45 m³/h.

The HEFAP was the coarse fraction resulting from the air classification (block 450) and had (1) the following optical properties: a Y value of 79.20, an L* value of 91.32, an a* value of 1.16 and a b* value of 4.81; and (2) the following PDS: D10: 19.69 μm; D50: 31.74 μm; D90: 50.81 μm; and D95: 59.92 μm.

The Standard Sheen values for the HEFAP examples listed in Table 9 range from 0.4 to 0.5 in the Standard Formulation as defined above (see Tables 6 and 7). For comparison, the other functional filler products that comprise DE and are in the public domain with Hegman fineness from 1.0 to 2.0 range from 0.6 to 0.8 for flux calcined (see Tables 1, 2, 3) and from 1.3 to 1.4 for natural grades (see Table 4). This comparison demonstrates the high Flatting Efficiency of HEFAP.

HEFAP Examples Comprising Diatomite and Having a Hegman Fineness from about 2.5 to about 3.5

Sample #38993

Table 10 shows HEFAP examples with a Hegman fineness from 2.5 to 3.5.

Sample #38993 has a Hegman fineness of 3.0 and was a co-product prepared by the double air classification process illustrated in FIG. 2 and previously described herein with respect to Sample #38992, except that Sample #38993 was the HEFAP provided by the fine fraction that resulted from the second air classification block 250.

The HEFAP provided by the fine fraction resulting from the second air classification (block 250) had (1) the following optical properties: a Y value of 86.11, an L* value of 94.36, an a* value of 0.00 and a b* value of 1.20; and (2) the following PDS: D10: 11.31 μm; D50: 20.03 μm; D90: 35.04 μm; and D95: 42.33 μm.

Samples #39148, and #39147

The same feed material (see Table 14) as that used for Sample #38993 was used to prepare samples #39148, and #39147; but with #39148 prepared from 1-step air classification according to the process 100 illustrated in FIG. 1, and #39147 from sieving using a Kemutec KEK laboratory centrifugal sifter according to the process 300 illustrated in FIG. 3.

Sample #39148

For Sample #39148, the feed material was fed into the air classifier via a Schenckprocess AccuRate 304 volumetric feeder. The feeder rate setting was 200 L/h, which was measured to be about 1.4 kg/h and the agitation rate was 400.

A Comex ACX-50 classifier was used for the air classification. The Comex ACX-50 classifier was equipped with high speed classifying system that included a separator stage and a cyclone stage. The classification speed for the air classification was 5200 RPM and the airflow was 45 m³/h.

The HEFAP was the fine fraction resulting from the air classification (block 130) and had (1) the following optical properties: a Y value of 87.64, an L* value of 95.01, an a* value of −0.06 and ab* value of 1.65; and (2) the following PDS: D10: 11.84 μm; D50: 21.59 μm; D90: 37.87 μm; and D95: 45.89 μm.

Sample #39147

For Sample #39147, the feed material was fed into the centrifugal sifter via a Schenckprocess AccuRate 304 volumetric feeder. The feeder rate setting was 100 L/h, which was measured to be about 520 g/h and the agitation rate was 300.

The feed material is sieved by a centrifugal sifter, (Kemutec KEK laboratory centrifugal sifter) set for a mesh size of 400 mesh. The resulting fine fraction was the HEFAP which had (1) the following optical properties: a Y value of 90.64, an L* value of 96.23, an a* value of 0.00 and a b* value of 2.17; and (2) the following PDS: D10: 11.79 μm; D50: 20.54 μm; D90: 34.81 μm; and D95: 41.76 μm.

Sample #38802

A similar feed material containing non-detectable crystalline silica content (free of crystalline silica content) was used to prepare Sample #38802 (see Table 15 for the chemistry properties of the feed materials) by a double air classification with a COMEX ACX-50 classifier according to the process 200 illustrated in FIG. 2. This feed material comprised flux calcined diatomaceous earth having (1) the following optical properties: a Y value of 87.99, an L* value of 95.16, an a* value of 0.83 and a b* value of 3.88; and (2) the following particle size distribution: D10=11.87, D50=27.60, D90=70.85 and D95=97.23. This diatomaceous earth was main bin material that was free of detectable crystalline silica.

For Sample #38802, the feed material was fed into the first air classification via a Schenckprocess AccuRate 304 volumetric feeder. The feeder rate setting was 200 L/h, which was measured to be about 1.4 kg/h and the agitation rate was 400.

A Comex ACX-50 classifier was used for the first air classification. The Comex ACX-50 classifier was equipped with high speed classifying system that included a separator stage and a cyclone stage. The classification speed for the first air classification was 5700 RPM and the airflow was 45 m³/h. The fine fraction collected in the first classification (block 230) had the following PDS: D10: 10.21 μm; D50: 17.87 μm; D90: 30.73 μm; and D95: 36.98 μm The fine fraction from the first air classification was fed into the second air classification via a Schenckprocess AccuRate 304 volumetric feeder. The feeder rate setting was 200 L/h, which was measured to be about 1.4 kg/h and the agitation rate was 400.

A Comex ACX-50 classifier was used for the second air classification. The Comex ACX-50 classifier was equipped with high speed classifying system that included a separator stage and a cyclone stage. The classification speed for the second air classification was 7000 RPM and the airflow was 45 m³/h. The HEFAP was the coarse fraction resulting from the second air classification (block 250) had (1) the following optical properties: a Y value of 81.64, an L* value of 92.42, an a* value of 0.49 and a b* value of 3.27; and (2) the following PDS: D10: 15.13 µm; D50: 22.85 µm; D90: 36.35 µm; and D95: 42.99 µm.

The Standard Sheen values for the HEFAP examples listed in Table 10 range from 0.6 to 0.7 in the Standard Formulation as defined above (see Tables 6 and 7). For comparison, the DE functional filler products in the public domain with Hegman fineness from 2.5 to 3.5 range from 0.9 to 1.2 for flux calcined (see Tables 1, 2, 3) and from 1.2 to 2.3 for natural grades (see Table 4). This comparison demonstrates the high Flatting Efficiency of HEFAP.

Sheen Parity Index of HEFAP Comprising Diatomite

The high effectiveness of HEFAP in flatting or sheen control can also be demonstrated by the Sheen Parity Index (see definition above). While the standard dosage of the fillers comprising diatomite in the Standard Formulation is 6.7 wt. %, reduced unit consumption can be achieved with use of a HEFAP comprising diatomite to obtain same flatting or sheen reduction compared to products already in the public domain.

Two examples of the Sheen Parity Index are shown in Tables 11 and 12. In Table 11, HEFAP Sample #38802 showed a Standard Sheen of 0.7, while commercial products with similar Hegman fineness and D95, like Celite 499 from Imerys (Samples #20023 and #39570), showed Standard Sheen values from 1.0 to 1.2. Reduced dosages of Sample #38802 showed Standard Sheen values of 0.7 and 1.1, when 20% and 40% reduction in dosage were used in the otherwise-same Standard Formulation. Therefore, in this case, the HEFAP Sample #38802 has a Sheen Parity between 80% and 60% since only 80% to 60% of the Standard Dosage will be necessary for the HEFAP to achieve the same flatting or sheen reduction as products in the public domain. Similar Sheen Parity Index was also observed for HEFAP Sample #38993 as shown in Table 12.

HEFAP Comprising Diatomite and Having Non-Detectable Crystalline Silica Content (Free of Crystalline Silica Content)

The crystalline silica content of the selected HEFAP made with feed materials containing non-detectable (total) crystalline silica (in other words, free of detectable crystalline silica) was measured with the LH Method and shown in Table 13. No detectable level of quartz, or cristobalite or tridymite or other polymorphous of crystalline silica was found in the selected HEFAP. For comparison, a significant quantity of crystalline silica phase (mostly cristobalite) was found in flux calcined products already in the public domain (see Table 8).

INDUSTRIAL APPLICABILITY

Whether the diatomite functional additive is calcined, flux calcined or natural, the current products all have limitations in terms of their effectiveness. The HEFAP disclosed herein that comprise diatomite possess the tint and brightness desired in functional additives and may provide a significant benefit to industry because such HEFAP may be substituted for other functional additives (that comprise DE) and that require a much higher unit consumption and provide much lower levels of sheen reduction. HEFAP provides for reduced unit consumption, higher levels of sheen reduction and smoother surface feel at certain levels of sheen than is possible with diatomite functional additives of the prior art. This disclosure also teaches HEFAP products that comprise diatomite and have either detectable or non-detectable levels (free of) of (total) crystalline silica content. The new products taught herein may have a Hegman in the range of about 0.5 to about 3.5, making them appropriate substitutes for diatomite functional additive products used in the highest volumes in industry.

What is claimed is:

1. A product comprising diatomite, wherein the product is powdered and has
    (a) Standard Sheen of 0.4 to 0.5 and Hegman of 1.0 to 2.0, or (b) Standard Sheen of 0.6 to 0.7 and Hegman of 2.5 to 3.5.

2. The product of claim 1, wherein the Standard Sheen is 0.4 to 0.5 and the Hegman is 1.0 to 2.0, wherein the product further has a Ratio (R) of 0.35 to 0.52.

3. The product of claim 1, wherein the Standard Sheen is 0.6 to 0.7 and the Hegman is 2.5 to 3.5, wherein the product further has a Ratio (R) of 0.34 to 0.45.

4. The product of claim 1, wherein the product further has a Y value of 79 to 91, and an L* value of 91 to 97.

5. The product of claim 1, wherein the product further has an a* value of −0.1 to 1.2.

6. The product of claim 1, wherein the product further has a b* value of 1.0 to 5.0.

7. The product of claim 1, wherein the product further has a Standard Contrast Ratio of 0.90 to 0.92.

8. The product of claim 1, wherein the product is free of a total crystalline silica content as measured according to an LH Method.

9. The product of claim 2, wherein the product is free of a total crystalline silica content as measured according to an LH Method.

10. The product of claim 3, wherein the product is free of a total crystalline silica content as measured according to an LH Method.

11. The product of claim 1, wherein the product is free of a cristobalite content as measured according to an LH method.

12. The product of claim 2, wherein the product is free of a cristobalite content as measured according to an LH method.

13. The product of claim 3, wherein the product is free of a cristobalite content as measured according to an LH method.

14. A method of using the product of claim 1 comprising adding the product of claim 1 into a paint, a coating, a personal care product, a plastic film, a paper, a fiberboard, an elastomer, an adhesive, a caulk or a sealant.

15. The product of claim 1, in which the diatomite comprises flux calcined diatomite,
    wherein the Standard Sheen is 0.4 to 0.5 and the Hegman is 1.0 to 2.0,
    wherein the product further has a D50 of 27 to 36 and a D95 of 58 to 68.

16. The product of claim 1, in which the diatomite comprises flux calcined diatomite,
    wherein the Standard Sheen is 0.6 to 0.7 and the Hegman is 2.5 to 3.5,
    wherein the product further has a D50 of 19 to 24 and a D95 of 40 to 46.

17. The product of claim 1, in which the diatomite comprises flux calcined diatomite, wherein the Standard Sheen is 0.4 to 0.5 and the Hegman is 1.0 to 2.0, and wherein the product further has a Flatting Efficiency of 96% to 99%.

18. The product of claim 1, in which the diatomite comprises flux calcined diatomite, wherein the Standard Sheen is 0.6 to 0.7 and the Hegman is 2.5 to 3.5, wherein the product further has a Flatting Efficiency of 93% to 99%.

19. The product of claim 11, in which the product is free of a quartz content as measured according to an LH method.

\* \* \* \* \*